US012090772B2

(12) United States Patent
Murayama

(10) Patent No.: US 12,090,772 B2
(45) Date of Patent: Sep. 17, 2024

(54) CASSETTE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 100 days.

(21) Appl. No.: 17/489,728

(22) Filed: Sep. 29, 2021

(65) Prior Publication Data

US 2022/0040999 A1 Feb. 10, 2022

Related U.S. Application Data

(63) Continuation of application No. PCT/JP2020/011088, filed on Mar. 13, 2020.

(30) Foreign Application Priority Data

Mar. 31, 2019 (JP) ................................ 2019-069562

(51) Int. Cl.

| | |
|---|---|
| ***B41J 32/00*** | (2006.01) |
| ***B41J 3/36*** | (2006.01) |
| ***B41J 15/04*** | (2006.01) |
| ***B41J 15/06*** | (2006.01) |

(52) U.S. Cl.

CPC ................ *B41J 32/00* (2013.01); *B41J 3/36* (2013.01); *B41J 15/044* (2013.01); *B41J 15/06* (2013.01)

(58) Field of Classification Search

None

See application file for complete search history.

(56) References Cited

U.S. PATENT DOCUMENTS

| | | | |
|---|---|---|---|
| 3,672,603 A | 6/1972 | Swain | |
| 3,804,227 A * | 4/1974 | Cappotto ................ | B41J 33/26 400/208 |
| 3,823,808 A | 7/1974 | Murata et al. | |

(Continued)

FOREIGN PATENT DOCUMENTS

| | | |
|---|---|---|
| AU | 9226101 A | 4/2002 |
| CA | 1119549 A | 3/1982 |

(Continued)

OTHER PUBLICATIONS

The extended European Search Report for the related European Patent Application No. 20785277.3 dated Jan. 3, 2023.

(Continued)

*Primary Examiner* — Matthew G Marini

(74) *Attorney, Agent, or Firm* — KENEALY VAIDYA LLP

(57) ABSTRACT

A cassette includes: a printing tape roll into which a printing tape as a medium to be printed is wound; a feed spool being rotatable and around which an ink ribbon to be used for printing on the printing tape is wound; and a take-up spool being rotatable to take up the ink ribbon fed from the feed spool. The feed spool and the take-up spool are located on one side in a first direction with respect to the printing tape roll. The first direction is a width direction of the ink ribbon wound around the feed spool. At least a portion of the feed spool and at least a portion of the take-up spool overlap the printing tape roll in the first direction.

17 Claims, 36 Drawing Sheets

(56) References Cited

U.S. PATENT DOCUMENTS

| | | | | |
|---|---|---|---|---|
| 4,034,935 | A | 7/1977 | Plaza et al. | |
| 4,402,619 | A | 9/1983 | Paque et al. | |
| 4,668,961 | A | 5/1987 | Hiramatsu | |
| 5,216,441 | A | 6/1993 | Isobe | |
| 5,374,132 | A | 12/1994 | Kimura | |
| 5,618,119 | A | 4/1997 | Misu et al. | |
| 2007/0147937 | A1* | 6/2007 | Hioki | C09J 7/38 400/613 |
| 2007/0172293 | A1 | 7/2007 | Vandermeulen | |
| 2011/0143073 | A1 | 6/2011 | Vandermeulen | |
| 2012/0080550 | A1 | 4/2012 | Yamaguchi et al. | |
| 2015/0283836 | A1 | 10/2015 | Sakano et al. | |
| 2015/0360493 | A1 | 12/2015 | Cao et al. | |
| 2016/0236495 | A1 | 8/2016 | Sakano et al. | |
| 2016/0368275 | A1 | 12/2016 | Sakano et al. | |
| 2017/0190195 | A1 | 7/2017 | Kosuge et al. | |
| 2018/0037043 | A1 | 2/2018 | Sakano et al. | |
| 2019/0030935 | A1 | 1/2019 | Sakano et al. | |
| 2020/0147988 | A1 | 5/2020 | Sakano et al. | |

FOREIGN PATENT DOCUMENTS

| | | | | |
|---|---|---|---|---|
| CN | 1865012 | A | 11/2006 | |
| CN | 107878049 | A | 4/2018 | |
| EP | 0473132 | A2 | 3/1992 | |
| EP | 2310208 | A1 | 4/2011 | |
| GB | 2016411 | A | 9/1979 | |
| JP | S50-36734 | B1 | 11/1975 | |
| JP | S54-111914 | A | 9/1979 | |
| JP | S59-95180 | A | 6/1984 | |
| JP | S60-36255 | U | 3/1985 | |
| JP | S60-48456 | U | 4/1985 | |
| JP | S60-224571 | A | 11/1985 | |
| JP | 63-156762 | U * | 10/1988 | |
| JP | S63-156762 | U | 10/1988 | |
| JP | H02-9562 | U | 1/1990 | |
| JP | H02-37568 | Y2 | 10/1990 | |
| JP | H03-284973 | A | 12/1991 | |
| JP | H04-110172 | A | 4/1992 | |
| JP | H04-152176 | A | 5/1992 | |
| JP | H8-39908 | A | 2/1996 | |
| JP | H8-90877 | A | 4/1996 | |
| JP | H11-240232 | A | 9/1999 | |
| JP | 2002308518 | A * | 10/2002 | B41J 15/044 |
| JP | 2004-255656 | A | 9/2004 | |
| JP | 2009-196804 | A | 9/2009 | |
| JP | 2011-37223 | A | 2/2011 | |
| WO | 02/32681 | A1 | 4/2002 | |
| WO | 2010/015666 | A1 | 2/2010 | |

OTHER PUBLICATIONS

Chinese Office Action for the related Chinese Patent Application No. 202080026161.1 dated May 7, 2022.

International Search Report and Written Opinion of the International Search Report for PCT/JP2020/011088 dated Apr. 14, 2020.

International Preliminary Report on Patentability and English language Written Opinion of the International Search Report for PCT/JP2020/011088 dated Sep. 28, 2021.

Japanese Office Action for the related Japanese Patent Application No. 2019-069562 dated Nov. 1, 2022.

Japanese Office Action for the related Japanese Patent Application No. 2019-069562 dated Mar. 28, 2023.

* cited by examiner

CASSETTE

CROSS-REFERENCE TO RELATED APPLICATIONS

This is a continuation application of International Application No. PCT/JP2020/011088 filed on Mar. 13, 2020 which claims priority from Japanese Patent Application No. 2019-069562 filed on Mar. 31, 2019. The entire contents of the earlier applications are incorporated herein by reference.

TECHNICAL FIELD

Aspects of the disclosure relate to a cassette to be detachably attached to a printing device.

BACKGROUND

Conventionally known is a cassette including a printing tape and an ink ribbon for printing on the printing tape. For example, a known ink ribbon cartridge as such a known cassette includes a ribbon cartridge and a printing tape cartridge. The ribbon cartridge accommodates an ink ribbon roll and a take-up spool for taking up the ink ribbon. The printing tape cartridge accommodates a printing tape roll. A plurality of set claws are provided on an outer peripheral wall of the printing tape cartridge. The printing tape cartridge and the ribbon cartridge are connected to each other by engagement of the set claws with the ribbon cartridge in a state where the printing tape cartridge is placed above the ribbon cartridge. The ribbon cartridge has a head opening into which a head of the printer is to be inserted. The printing tape cartridge includes a tape opening that allows the printing tape to pass therethrough. The tape opening is located opposite to the head opening with respect to the printing tape roll in the printing tape cartridge. The printing tape is drawn from the printing tape roll to the outside of the printing tape cartridge through the tape opening. Thereafter, the printing tape travels along and around the outer peripheral wall of the printing tape cartridge through passes the head opening. In the head opening, while the printing tape and the ink ribbon are laid on each other, printing is performed by the head of the printer. The printed printing tape is guided, by the set claw disposed on the head opening side, to a film gate for discharging the printing tape. The ink ribbon used for printing is taken up by the take-up spool.

SUMMARY

In the ink ribbon cartridge, the ink ribbon roll and the printing tape roll are placed at respective different positions in an axial direction of the take-up spool, that is, in an up-down direction, thereby downsizing the cartridge in a direction orthogonal to the up-down direction. Nevertheless, the cassette is to be further downsized in the direction orthogonal to the up-down direction.

The disclosure has been made in view of the above circumstances, and aspects of the disclosure provide a cassette that may be downsized in a direction orthogonal to a width direction of an ink ribbon.

In one or more aspects of the disclosure, a cassette may include: (a) a printing tape roll into which a printing tape as a medium to be printed is wound; (b) a feed spool being rotatable and around which an ink ribbon to be used for printing on the printing tape is wound; and a take-up spool being rotatable to take up the ink ribbon fed from the feed spool, wherein: (c) the feed spool and the take-up spool are located on one side in a first direction with respect to the printing tape roll, the first direction being a width direction of the ink ribbon wound around the feed spool; and (d) at least a portion of the feed spool and at least a portion of the take-up spool overlap the printing tape roll in the first direction. The printing tape roll, the feed spool, and the take-up spool are thus separately located in the first direction and the at least a portion of the feed spool and the at least a portion of the take-up spool overlap the printing tape roll in the first direction, whereby the cassette may be downsized in a direction orthogonal to the first direction.

In one or more aspects of the disclosure, a cassette may include: (a) a printing tape roll into which a printing tape as a medium to be printed is wound; (b) a feed spool being rotatable and around which an ink ribbon to be used for printing on the printing tape is wound; (c) a take-up spool being rotatable to take up the ink ribbon fed from the feed spool; and (d) a spacer film contacting the printing tape roll in a first direction being a width direction of the ink ribbon wound around the feed spool, wherein (e) at least a portion of the feed spool and at least a portion of the take-up spool overlap the printing tape roll in the first direction. The cassette may be thus downsized in a direction orthogonal to the first direction as compared with a case where the spacer film does not overlap the feed spool and the take-up spool in the first direction.

DETAILED DESCRIPTION

Hereinafter, illustrative embodiments of the disclosure will be described with reference to the drawings.

First Illustrative Embodiment

Figure 1:
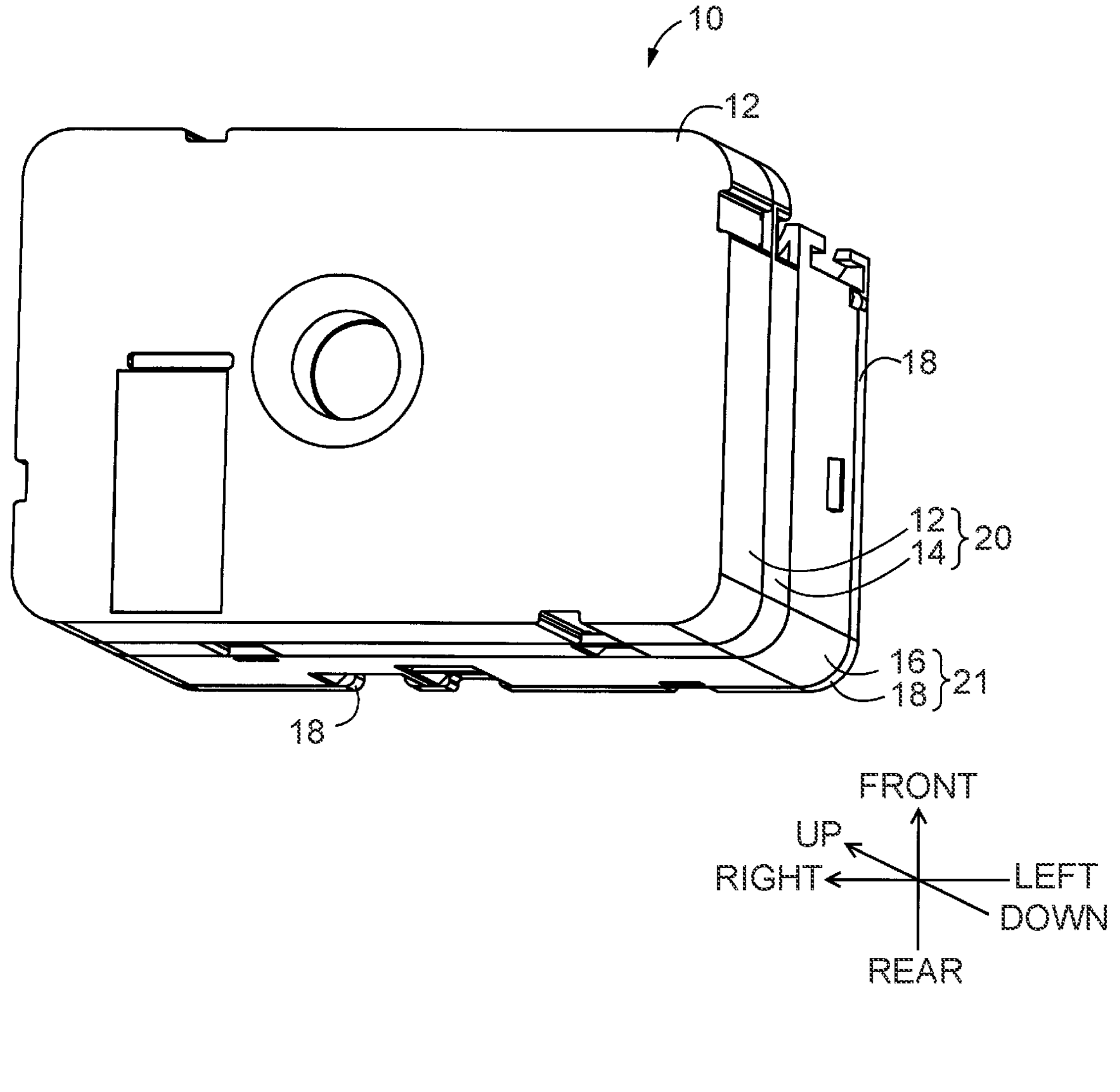
FIG. 1 is a perspective view illustrating an upper surface side of a laminated type cassette according to a first illustrative embodiment of the disclosure.
Figure 2:
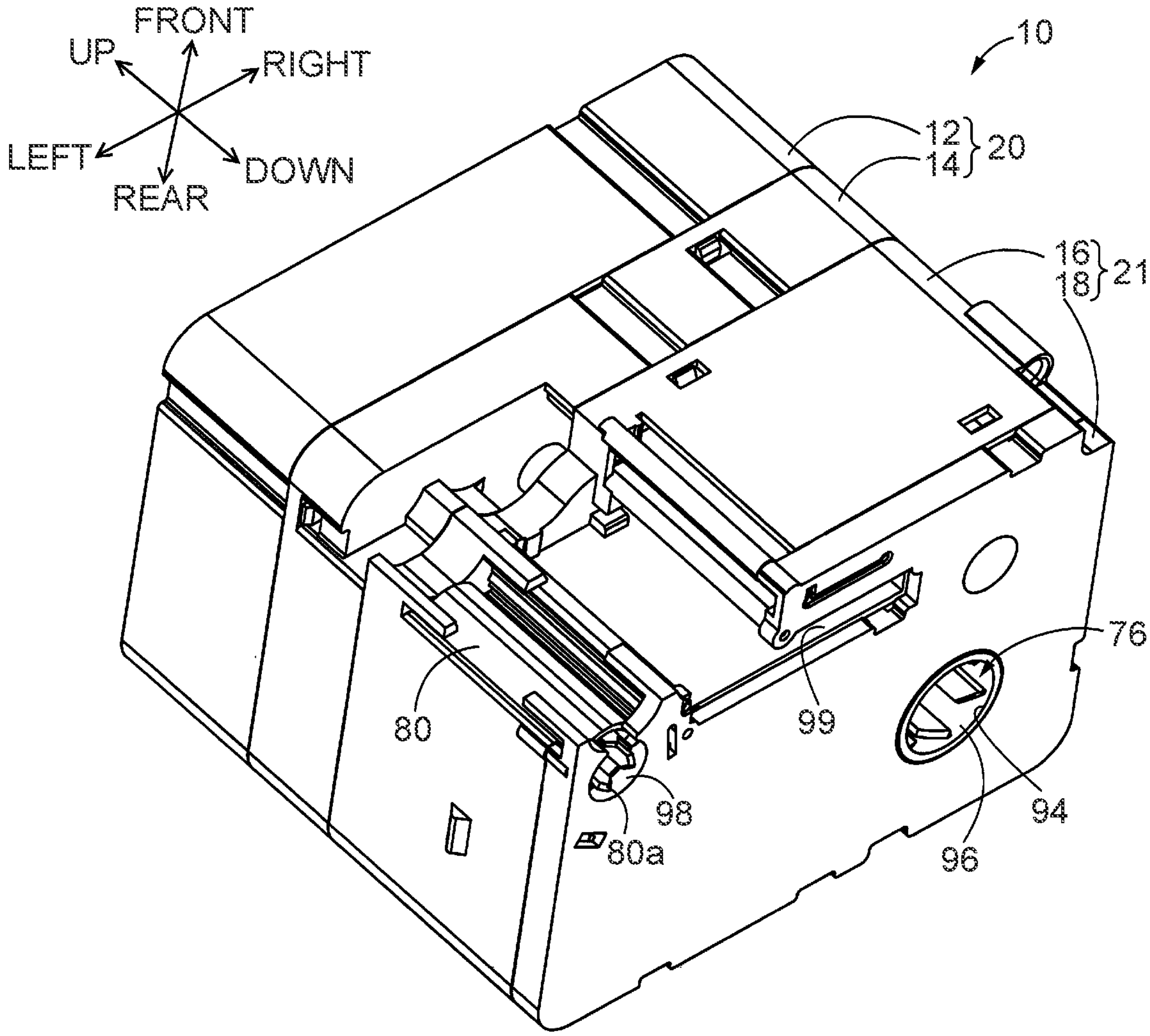
FIG. 2 is a perspective view illustrating a lower surface side of the cassette FIG. 1.
Figure 3:
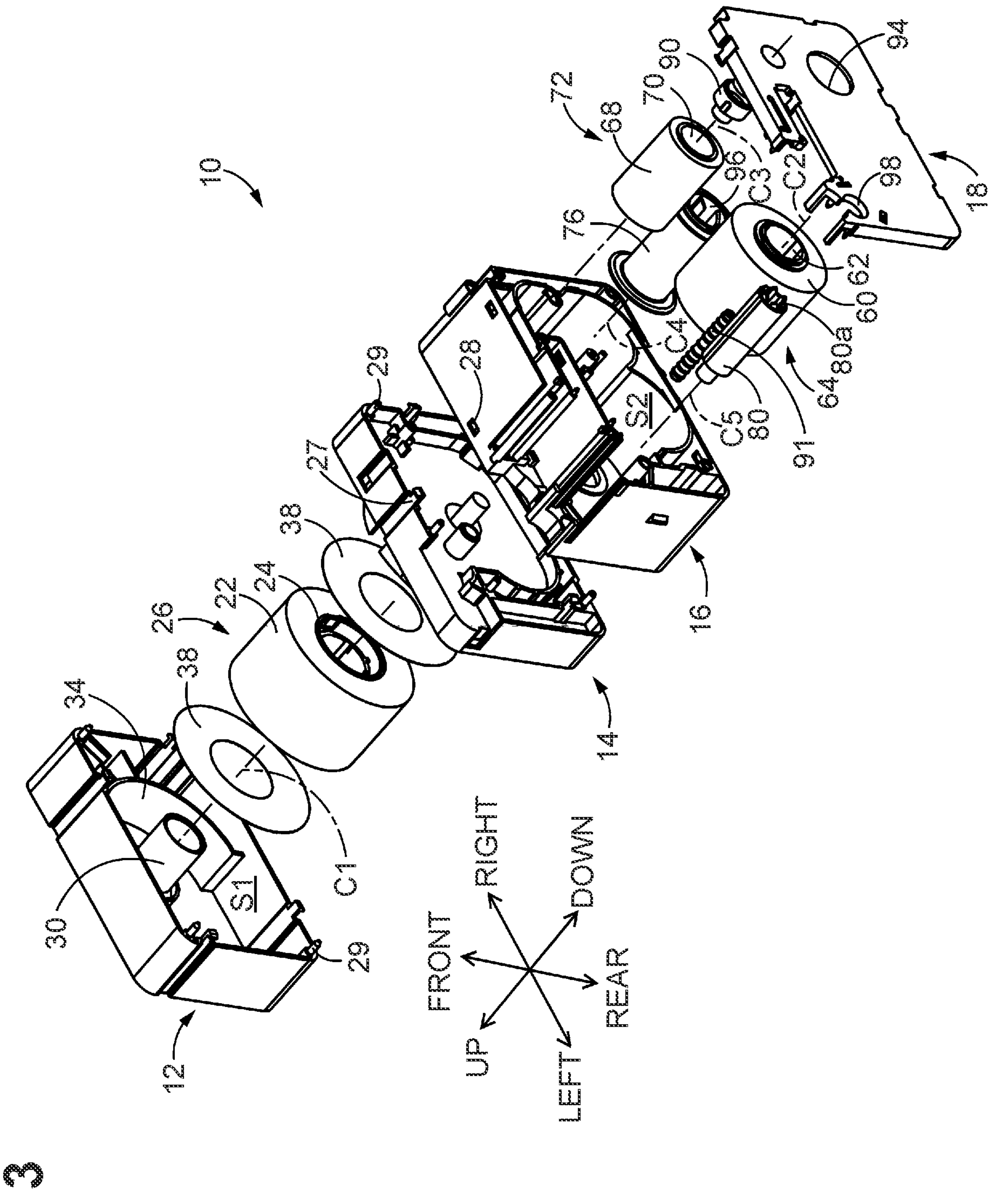
FIG. 3 is a perspective view illustrating a configuration of a case of the cassette of FIG. 1 and an internal configuration of the case of the cassette, wherein a first case member, a second case member, a third case member, and a fourth case member constituting the case are disassembled.

FIG. 1 is a perspective view of a cassette 10 according to a first illustrative embodiment, when viewed from an obverse surface side, that is, an upper surface side, of the cassette 10. In the description of the illustrative embodiment, an upper side, lower side, right side, and left side of FIG. 1 refer to a front side, rear side, left side, and right side of the cassette 10, respectively. An upper left side and lower right side of FIG. 1 refer to an upper side and lower side of the cassette 10, respectively. FIG. 2 is a perspective view of the cassette 10, when viewed from a back surface side, that is, the lower surface side, of the cassette 10. FIG. 3 is a disassembled perspective view of the cassette 10, illustrating an internal configuration of the cassette 10, wherein a first case member 12, a second case member 14, a third case member 16, and a fourth case member 18 constituting the cassette 10 are disassembled. The cassette 10 has a rectangular parallelepiped shape as a whole. The cassette 10 is to be detachably attached to a cassette mounting portion 104 of a printing device 102 described later in FIG. 18. The cassette 10 includes a tape case 20 composed of the first case member 12 and the second case member 14, and a ribbon case 21 composed of the third case member 16 and the fourth case member 18. A direction in which the first case member 12 to the fourth case member 18 are stacked one above another, that is, an up-down direction in FIG. 1 corresponds to a first direction in the disclosure. A front-rear direction in FIG. 1 corresponds to a second direction orthogonal to the first direction. A right-left direction in FIG. 1 corresponds to a third direction orthogonal to the first direction and the second direction.

The ribbon case 21 is located on one side in the up-down direction with respect to the tape case 20. In the illustrative embodiment, the ribbon case 21 is located on a lower side, that is, the one side in the up-down direction with respect to the tape case 20. The tape case 20 has a first space S1 defined therein. The tape case 20 includes, in the first space S1, a printing tape roll 26 into which a printing tape 22 as a medium to be printed is wound. The ribbon case 21 has a second space S2 defined therein. The ribbon case 21 includes an ink ribbon roll 72 and a laminating tape roll 64 in the second space S2.

In the ink ribbon roll 72, an ink ribbon 68 that is a continuous strip is wound around a feed spool 70 such that a width direction of the ink ribbon 68 corresponds to the up-down direction. The ink ribbon 68 is used for printing on the printing tape 22 that is a continuous strip. A radial direction of the ink ribbon roll 72 includes the front-rear direction and the right-left direction. That is, the radial direction is an orthogonal direction orthogonal to the up-down direction. The orthogonal direction may also be referred to as an arbitrary direction parallel to a plane orthogonal to the up-down direction. In the laminating tape roll 64, a laminating tape 60 that is a continuous strip and is to be adhered to a printed portion of the printing tape 22 is wound around a laminating tape spool such that a width direction of the laminating tape 60 corresponds to the up-down direction. The first case member 12, the second case member 14, the third case member 16, and the fourth case member 18 include locking claws 27, fixing holes 28, and positioning projections 29 at appropriate positions of their outer peripheral walls. The first case member 12, the second case member 14, the third case member 16, and the fourth case member 18 are fixed to each other in a stacked manner in the up-down direction by engagement between the locking claws 27 and the fixing holes 28 while the first case member 12, the second case member 14, the third case member 16, and the fourth case member 18 are positioned relative to each other by the positioning projections 29. In the illustrative embodiment, an upper surface of each case member 12 to 18 is referred to as an upper or obverse surface, and a lower surface of each case member 12 to 18 is referred to as a lower or back surface.

As illustrated in FIG. 2, the fourth case member 18 of the cassette 10 has a take-up spool support hole 94. The take-up spool support hole 94 penetrates the lower surface of the fourth case member 18 in the up-down direction. The third case member 16 and the fourth case member 18, that is, the ribbon case 21 has a recess 99 at its front surface. When the cassette 10 is mounted on the cassette mounting portion 104 of the printing device 102, a print head 106 disposed at the cassette mounting portion 104 is inserted to the recess 99.

Figure 4:
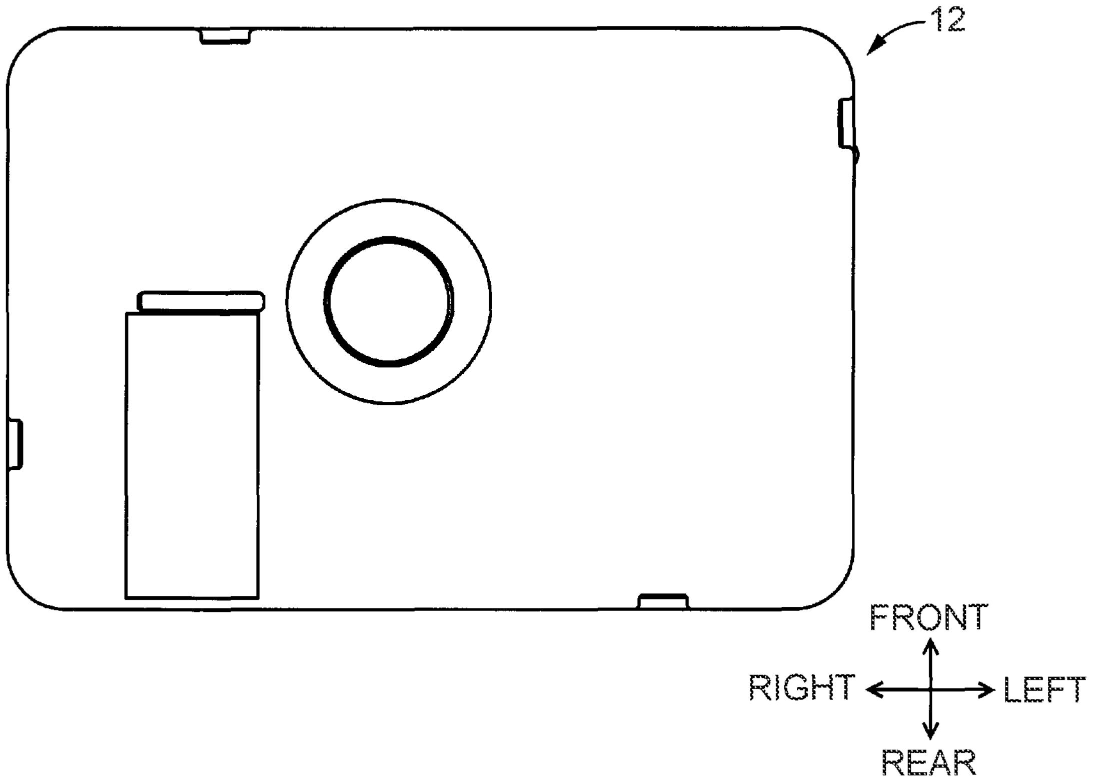
FIG. 4 is a front view illustrating an upper surface side of the first case member of FIG. 1.
Figure 5:
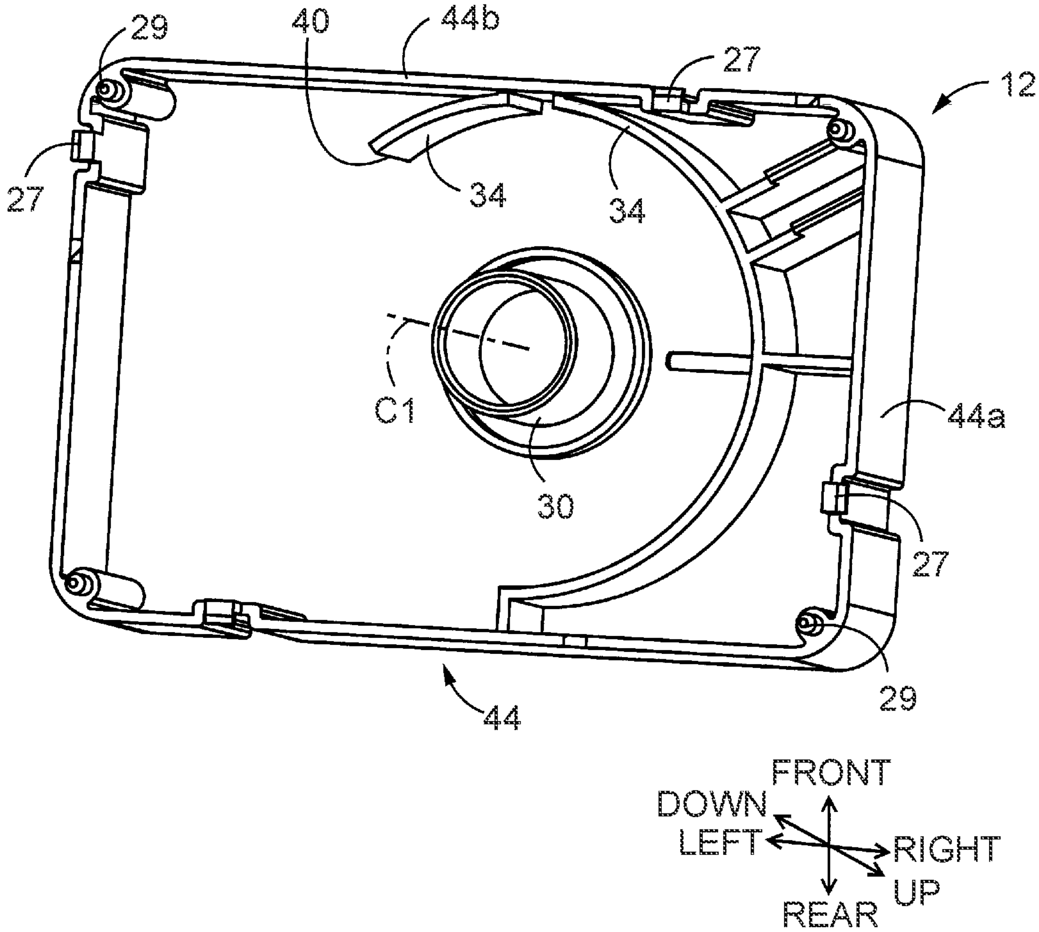
FIG. 5 is a perspective view illustrating a lower surface side of the first case member of FIG. 1.
Figure 6:
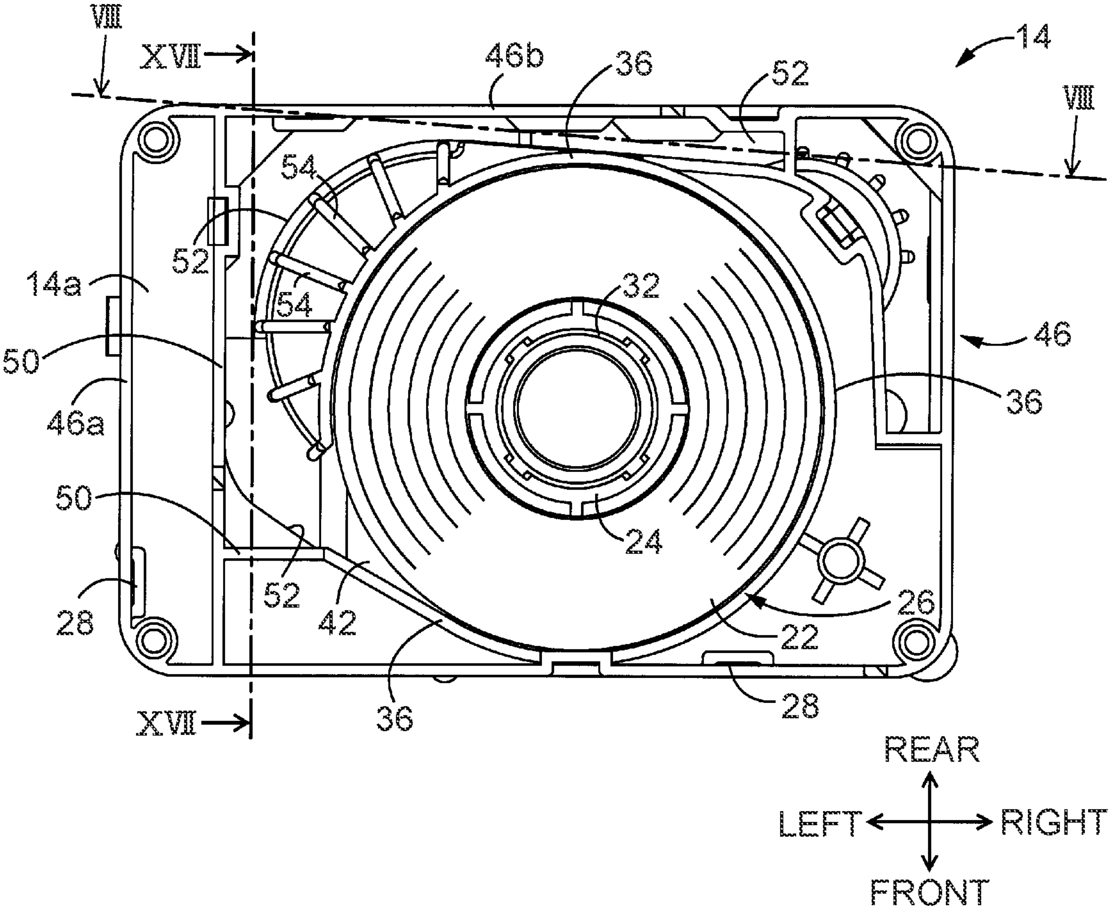
FIG. 6 is a front view illustrating an upper surface side of the second case member of FIG. 1 with a printing tape roll.
Figure 7:
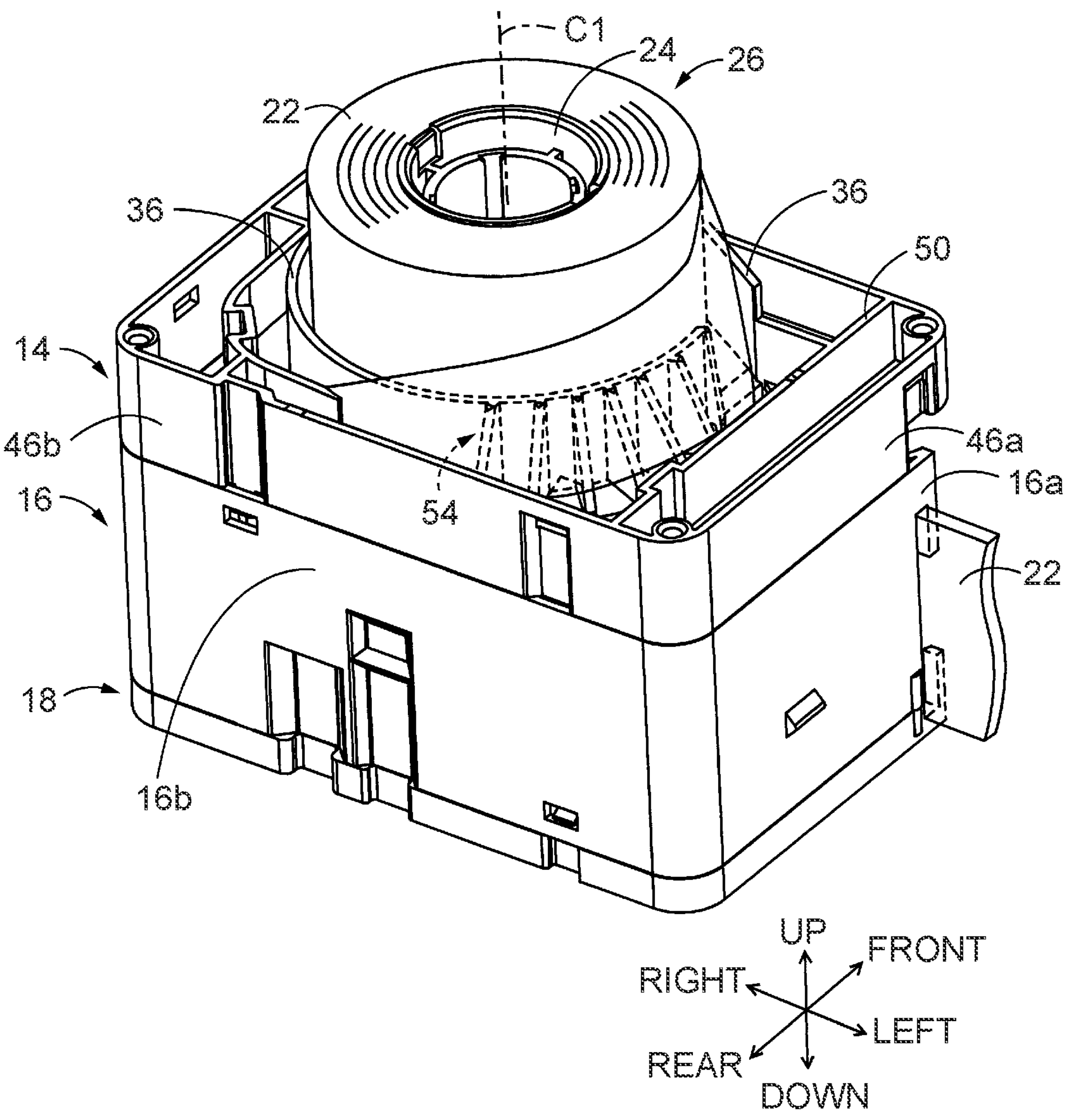
FIG. 7 is a perspective view illustrating the cassette of FIG. 1 with the first case member removed.
Figure 8:
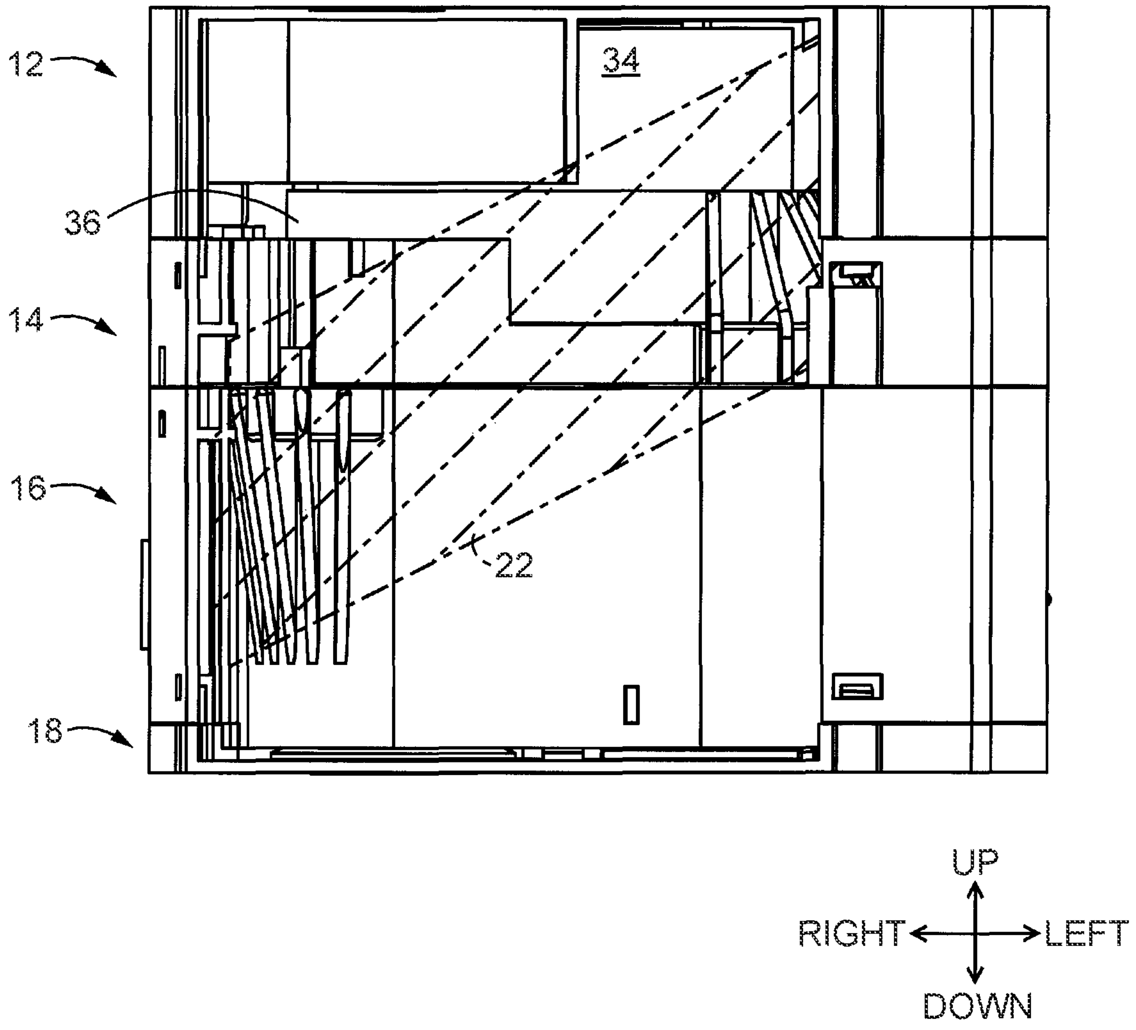
FIG. 8 is a cross sectional view taken along line VIII-VIII in FIG. 6, illustrating a state where a printing tape extends from the inside of a tape case to the inside of a ribbon case.
Figure 9:
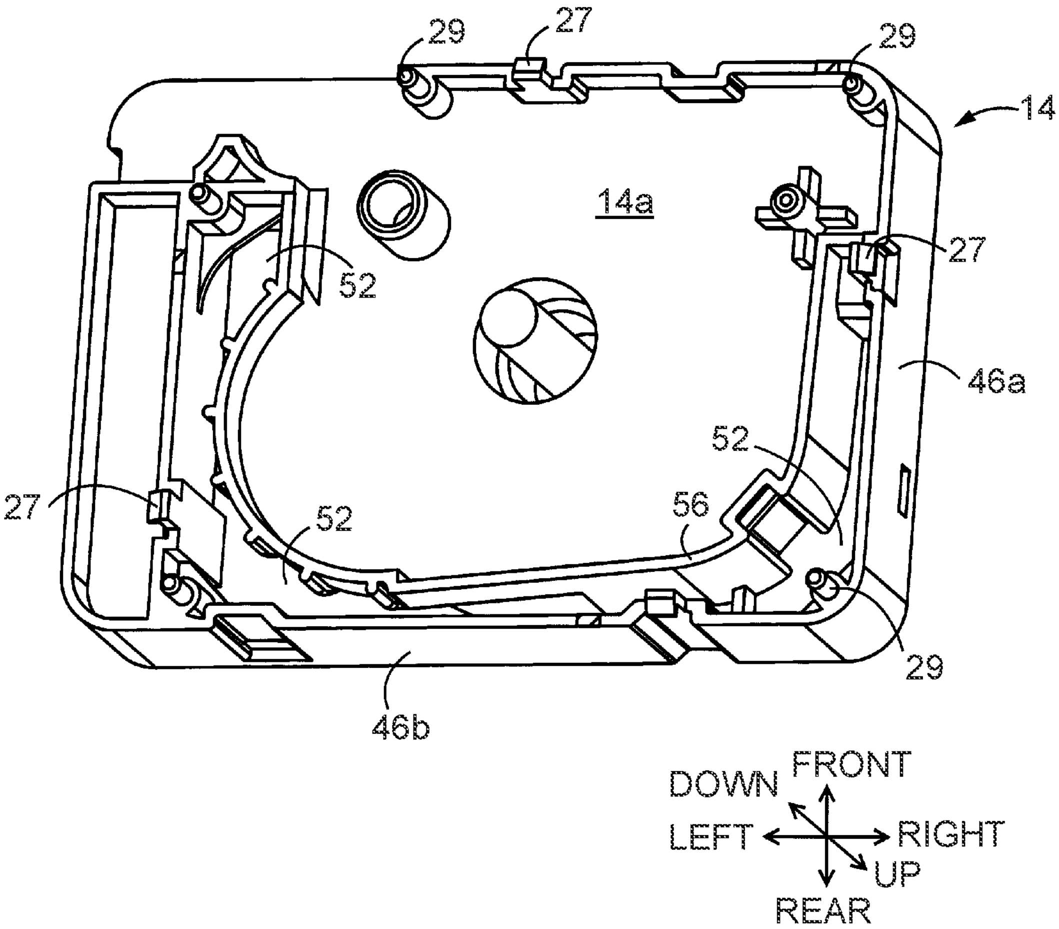
FIG. 9 is a perspective view illustrating a lower surface side of the second case member of FIG. 1.
Figure 10:
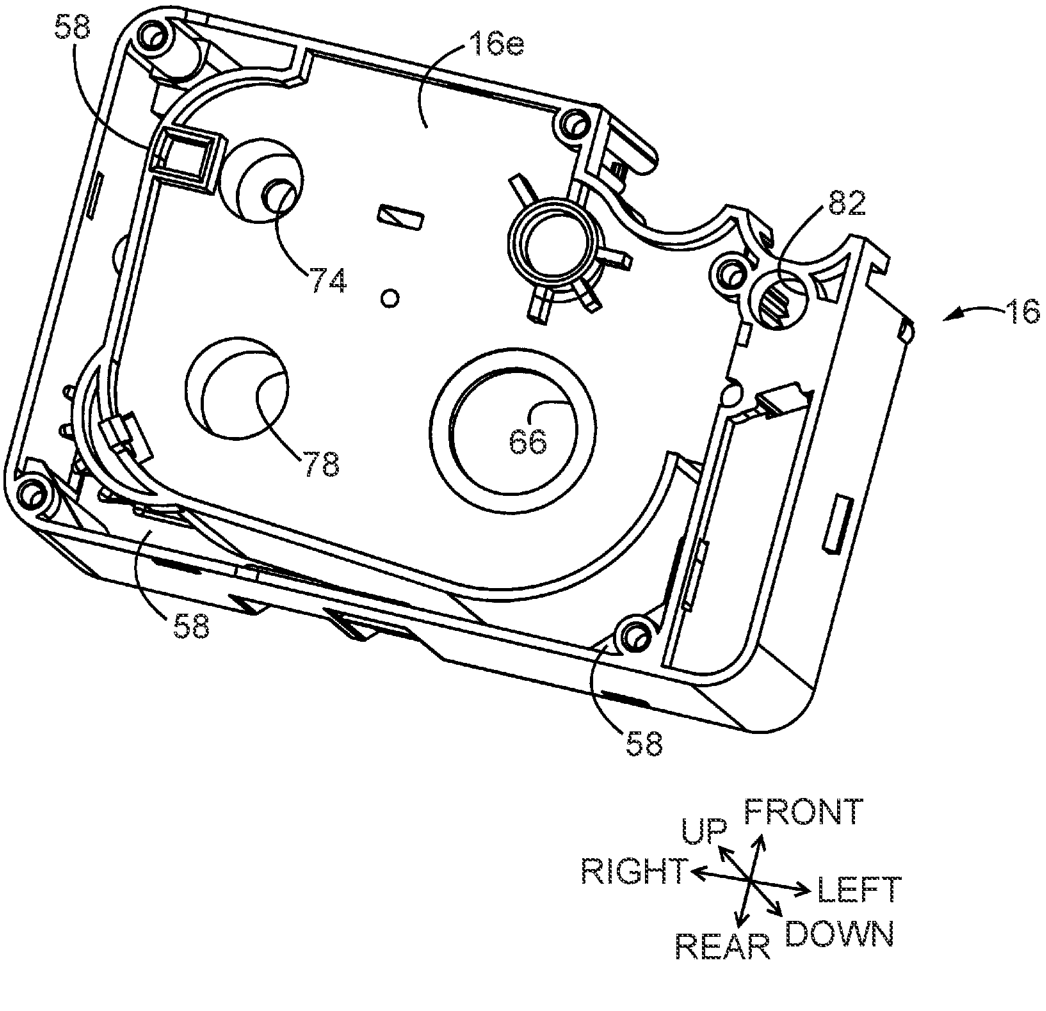
FIG. 10 is a perspective view illustrating an upper surface side of the third case member of FIG. 1.
Figure 11:
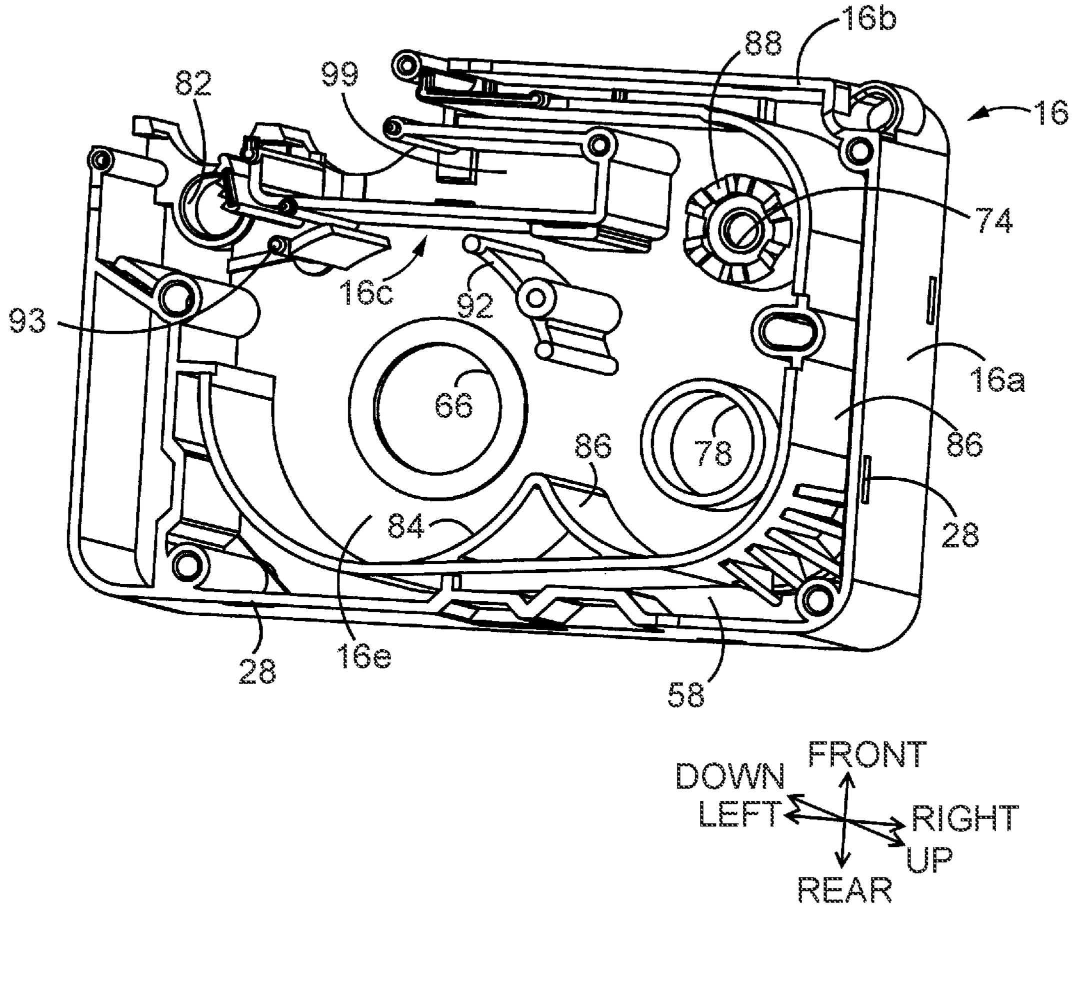
FIG. 11 is a perspective view illustrating a lower surface side of the third case member of FIG. 1.
Figure 12:
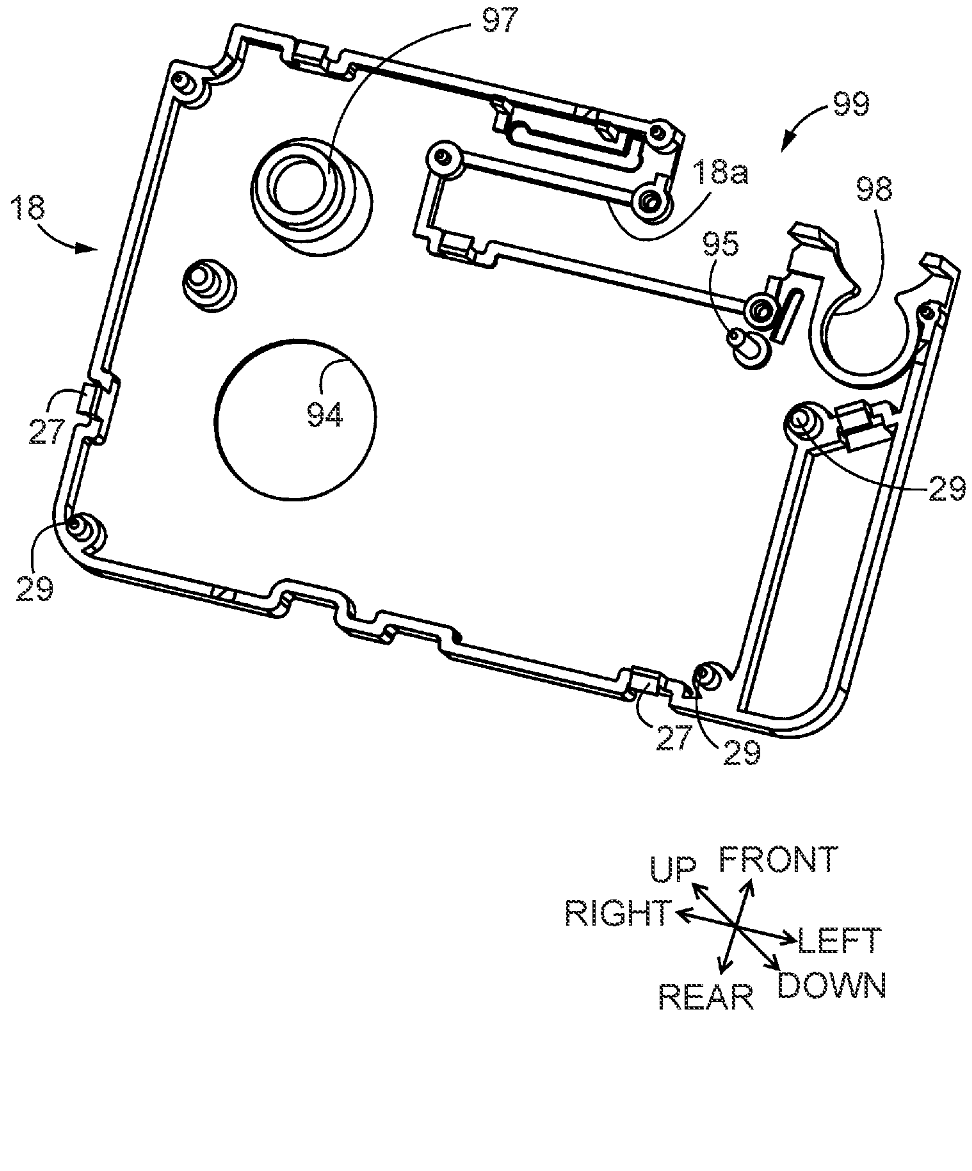
FIG. 12 is a perspective view illustrating an upper surface side of the fourth case member of FIG. 1.
Figure 13:
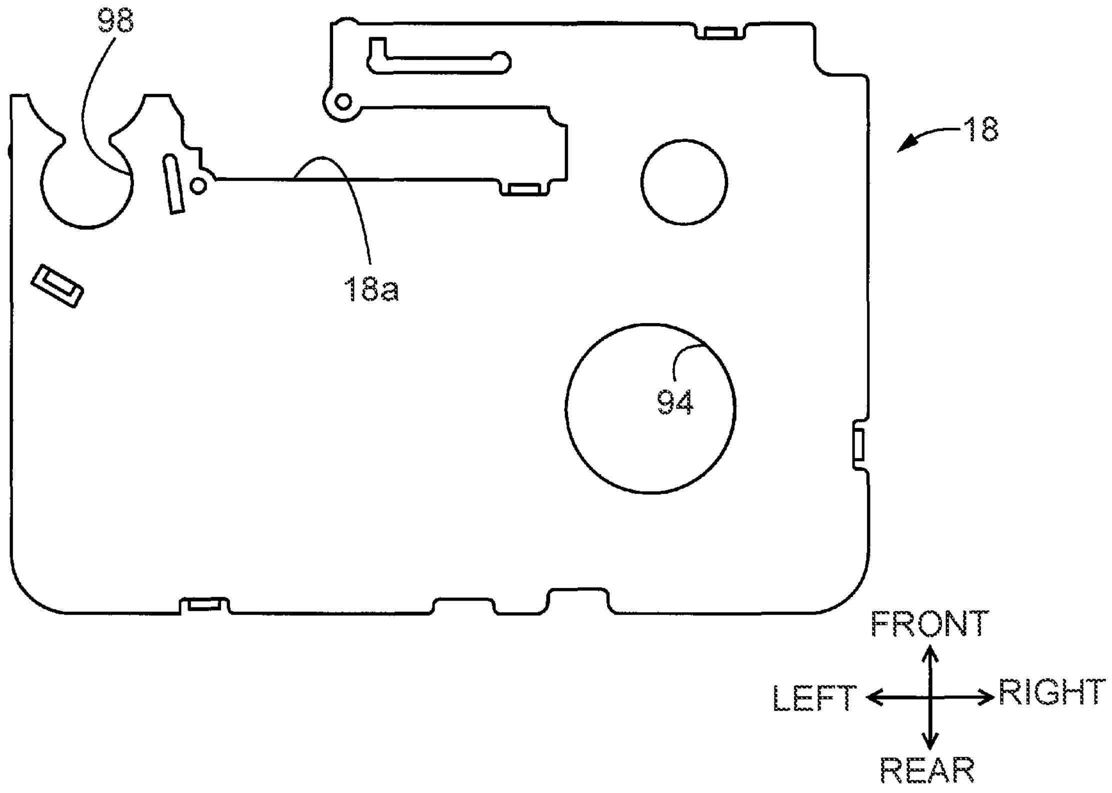
FIG. 13 is a bottom view illustrating a lower surface side of the fourth case member of FIG. 1.

FIG. 4 is a front view illustrating the upper surface side of the first case member 12. FIG. 5 is a perspective view illustrating the lower surface side of the first case member 12. FIG. 6 is a front view illustrating the upper surface side of the second case member 14. In FIG. 6, the printing tape 22 drawn from the printing tape roll 26 is not illustrated. FIG. 7 is a perspective view illustrating the upper surface side of the second case member 14. FIG. 8 is a cross sectional view taken along line VIII-VIII in FIG. 6, illustrating a state where the printing tape 22 extends from the inside of the tape case 20 to the inside of the ribbon case 21. FIG. 9 is a perspective view illustrating the lower surface side of the second case member 14. FIG. 10 is a perspective view illustrating the upper surface side of the third case member 16. FIG. 11 is a perspective view illustrating the lower surface side of the third case member 16. FIG. 12 is a perspective view illustrating the upper surface side of the fourth case member 18. FIG. 13 is a bottom view illustrating the lower surface side of the fourth case member 18.

The first space S1 is defined between the first case member 12 and the second case member 14. The printing tape roll 26 is accommodated in the first space S1 so as to be rotatable about a first rotation axis C1 extending parallel to the up-down direction. The first rotation axis C1 is a rotation axis of a printing tape spool 24 as well as a rotation axis of the printing tape roll 26. In the printing tape roll 26, a printing tape 22 is wound around a printing tape spool 24 that is a cylindrical shaft core member. The first case member 12 and the second case member 14 each have a rectangular shape. The first rotation axis C1 is offset to the right from the centers of the first case member 12 and the second case member 14 with respect to the right-left direction that is the second direction, and coincides with the centers of the first case member 12 and the second case member 14 with respect to the front-rear direction that is the third direction.

Figure 15:
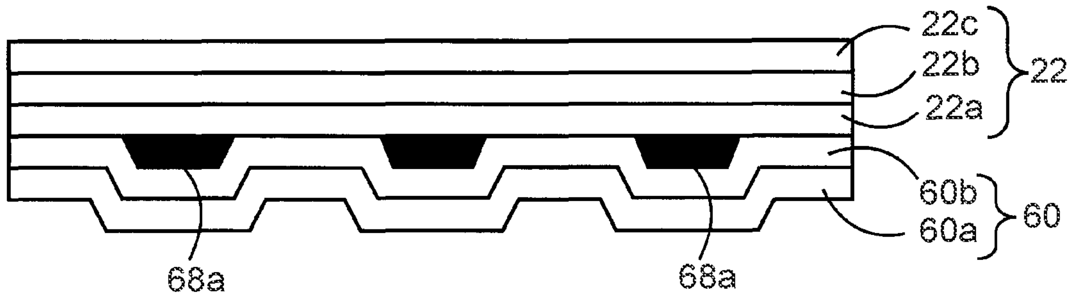
FIG. 15 illustrates a laminate of the printing tape and the laminating tape both discharged from the cassette of FIG. 1.

The printing tape 22 is a medium to be printed on which printing is to be performed by the print head 106. For example, as illustrated in FIG. 15, the printing tape 22 is a laminate in which a release tape 22*c* is laid over a surface opposite to a to-be-printed surface of a to-be-printed tape 22*a* via an adhesive 22*b*.

As illustrated in FIGS. 3 and 5, the first case member 12 includes a cylindrical first support projection 30 and a first circumferential wall 34 at its lower surface. The first support projection 30 is inserted into the cylindrical printing tape spool 24 to support the printing tape roll 26 rotatably. The first case member 12 includes an outer peripheral wall 44 having short side portions 44*a* and long side portions 44*b*. The first circumferential wall 34 has an inside diameter greater than an outside diameter of the printing tape roll 26. The first support projection 30 and the first circumferential wall 34 have an axis that is coaxial with the first rotation axis C1, and protrude downward from the lower surface of the first case member 12. As illustrated in FIGS. 6 and 7, the second case member 14 includes a cylindrical second support projection 32 and a second circumferential wall 36 at its upper surface. The second support projection 32 is inserted into the cylindrical printing tape spool 24 to support the printing tape roll 26 rotatably. The second circumferential wall 36 has an inside diameter greater than the outside diameter of the printing tape roll 26. The second support projection 32 and the second circumferential wall 36 have an axis that is coaxial with the first rotation axis C1, and protrude upward from the upper surface of the second case member 14. The printing tape roll 26 is disposed between the first case member 12 and the second case member 14 while spacer films 38 are each positioned on an upper or lower side of the printing tape roll 26. Each spacer film 38 has a disc-shape having an outside diameter equal to the outside diameter of the printing tape roll 26.

As illustrated in FIG. 5, the first case member 12 includes a printing tape gate 40 at its lower surface. The first circumferential wall 34 is partially cut away to define the printing tape gate 40. As illustrated in FIG. 6, the second case member 14 includes a printing tape gate 42 at its upper surface. The second circumferential wall 36 is partially cut away to define the printing tape gate 42. The printing tape gates 40 and 42 allow the printing tape 22 to be drawn from the printing tape roll 26 at a certain position. As illustrated in FIGS. 6 and 7, the second case member 14 includes a guide wall 50 at its upper surface. The guide wall 50 extends leftward from a left end of the printing tape gate 42. The guide wall 50 guides, in a certain direction, the printing tape 22 drawn from the printing tape roll 26.

As illustrated in FIG. 6, the guide wall 50 extending leftward from the left end of the printing tape gate 42 bends toward the long side portion 46*b*, that is, toward the rear, before reaching the short side portion 46*a* of an outer peripheral wall 46, and further extends to the long side portion 46*b* along the second circumferential wall 36.

As illustrated in FIG. 6, the second case member 14 includes a bottom plate 14*a* having a through hole 52. The through hole 52 extends in the front-rear direction and in the right-left direction along the guide wall 50 and the long side portion 46*b* of the outer peripheral wall 46, and thus has an L-shape in front view. A plurality of guide ribs 54 is disposed at the bottom plate 14*a* between a particular portion of the second circumferential wall 36 and the through hole 52. The particular portion of the second circumferential wall 36 faces the guide wall 50 and the long side portion 46*b*. The plurality of guide ribs 54 guides, into the through hole 52, the printing tape 22 drawn and fed from the printing tape roll 26 through the printing tape gates 40 and 42.

FIG. 7 illustrates the cassette 10 with the first case member 12 removed. As illustrated in FIG. 7, the printing tape 22 drawn from the printing tape roll 26 is guided to a second space S2 via the through hole 52. The second space S2 is defined between the third case member 16 and the fourth case member 18. The printing tape 22 extends between the tape case 20 and the ribbon case 21 via the through hole 52 defined in the bottom plate 14*a* that serves as a plate member separating the first space S1 and the second space S2 from each other.

Figure 14:
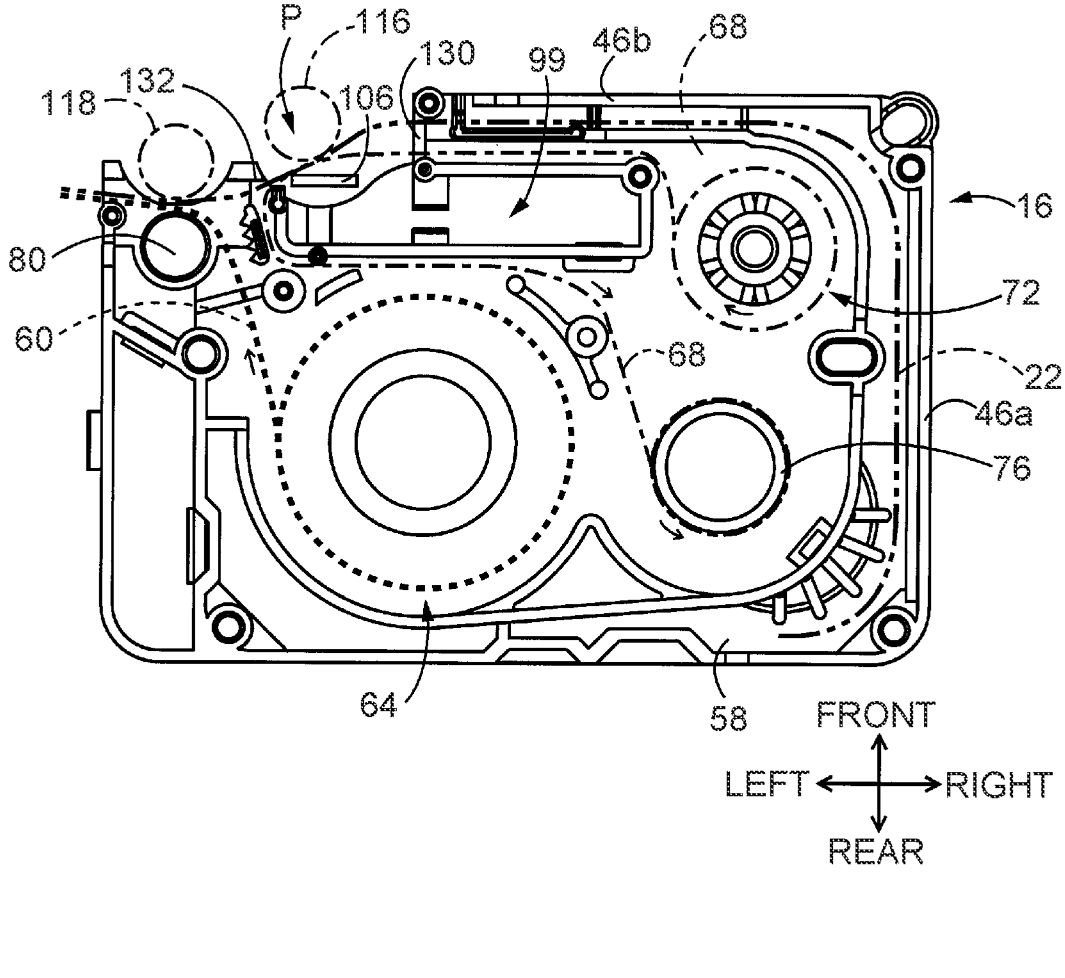
FIG. 14 is a view illustrating a path of the printing tape drawn from the printing tape roll, a path of a laminating tape drawn from a laminating tape roll, and a path of the ink ribbon drawn from an ink ribbon roll, using a view illustrating the lower surface of the third case member of FIG. 1.

As illustrated in FIG. 8, the printing tape 22 extends in an inclined manner from the inside of the tape case 20 to the inside of the ribbon case 21 via the through hole 52. More specifically, as illustrated in FIG. 14, the printing tape 22 further extends to the recess 99 of the ribbon case 21. FIG. 9 illustrates the lower surface side of the second case member 14. As illustrated in FIG. 9, the through hole 52 penetrates the bottom plate 14*a* of the second case member 14 in bottom view. A guide wall 56 stands on a back surface of the bottom plate 14*a* of the second case member 14 in the up-down direction and extends along the through hole 52.

FIG. 10 illustrates the upper surface side of the third case member 16. The third case member 16 has a through hole 58, a laminating tape roll support hole 66, an ink ribbon support hole 74, a take-up spool support hole 78, and a roller support hole 82 defined in a ceiling plate 16*e* thereof. The through hole 58 is defined at a position corresponding to the through hole 52 of the second case member 14 to route the printing tape 22 drawn from the printing tape roll 26 to the second space S2. That is, a portion of the through hole 52 and a portion of the through hole 58 overlap each other in the up-down direction.

The bottom plate 14*a* of the second case member 14 and the ceiling plate 16*e* of the third case member 16 separate the first space S1 of the tape case 20 and the second space S2 of the ribbon case 21 from each other.

The laminating tape roll 64 is supported by the laminating tape roll support hole 66 so as to be rotatable about a second rotation axis C2 while one end of a laminating tape spool 62 around which the laminating tape 60 is wound is engaged in the laminating tape roll support hole 66. The second rotation axis C2 is parallel to the first rotation axis C1. The second rotation axis C2 is a rotation axis of the laminating tape spool 62 as well as a rotation axis of the laminating tape roll 64. As illustrated in FIG. 15, the laminating tape 60 includes a transparent film 60*a* with an adhesive 60*b* applied to, for example, one side of the transparent film 60*a* entirely. The laminating tape 60 is used for protecting a printed surface of the printing tape 22. The one side of the transparent film 60*a* is to be contacted to the printed surface of the printing tape 22. The ink ribbon roll 72 is supported by the ink ribbon support hole 74 so as to be rotatable about a third rotation axis C3 while one end of the feed spool 70 around which the ink ribbon 68 is wound is engaged in the ink ribbon support hole 74. The third rotation axis C3 is parallel to the first rotation axis C1. The third rotation axis C3 is a rotation axis of the feed spool 70 as well as a rotation axis of the ink ribbon roll 72. A take-up spool 76 is supported by the take-up spool support hole 78 so as to be rotatable about a fourth rotation axis C4 while one end of the take-up spool 76 is engaged in the take-up spool support hole 78. The take-up spool 76 takes up the ink ribbon 68 drawn from the ink ribbon roll 72. The fourth rotation axis C4 is parallel to the first rotation axis C1. The fourth rotation axis C4 is a rotation axis of the take-up spool 76. A roller 80 is supported by the roller support hole 82 so as to be rotatable about a fifth rotation axis C5 while one end of the roller 80 is engaged in the roller support hole 82. The roller 80 and a roller of the printing device 102 nip the printing tape 22 and the laminating tape 60 therebetween to press and adhere a printed surface of the printing tape 22 and an adhesive surface of the laminating tape 60 to each other. The fifth rotation axis C5 is parallel to the first rotation axis C1.

As illustrated in FIG. 11, the third case member 16 includes a laminating tape roll holding wall 84, an ink ribbon roll holding wall 86, a cylindrical projection 88, and an arc-shaped wall 92 at its lower surface. The laminating tape roll holding wall 84 and the arc-shaped wall 92 each have an arc shape. The laminating tape roll holding wall 84 and the arc-shaped wall 92 are disposed around the laminating tape roll support hole 66 concentrically about the center of the laminating tape roll support hole 66 to define an install position of the laminating tape roll 64. The ink ribbon roll holding wall 86 has an arc shape. The ink ribbon roll holding wall 86 is disposed around the take-up spool support hole 78 concentrically about the center of the take-up spool support hole 78 to define an install position of the ink ribbon 68 taken up by the take-up spool 76. The cylindrical projection 88 protrudes downward from the periphery of the ink ribbon support hole 74. The cylindrical projection 88 has, at its distal end, ridges and grooves arranged in a circumferential direction of the cylindrical projection 88. The third case member 16 includes short side portions 16*a*, long side portions 16*b*, and a U-shaped recess wall 16*c* that constitute an outer peripheral wall of the third case member 16. The U-shaped recess wall 16*c* surrounds the recess 99. The third case member 16 includes a support projection 93 at its lower surface. The support projection 93 supports an upper end portion of an anti-sticking roller 91 rotatably. The anti-sticking roller 91 prevents sticking of the laminating tape 60 to the ink ribbon 68. As illustrated in FIG. 12, the fourth case member 18 includes a support projection 95 at its upper surface. The support projection 95 supports the anti-sticking roller 91 such that a lower end portion of the anti-sticking roller 91 may be coupled to the support projection 95.

As illustrated in FIG. 3, a clutch spring holder 90 accommodating a clutch spring is engaged with the other end of the feed spool 70 around which the ink ribbon 68 is wound. The clutch spring in the clutch spring holder 90 is configured to apply an appropriate rotational resistance to the ink ribbon roll 72.

FIG. 12 illustrates the upper surface of the fourth case member 18. FIG. 13 illustrates the lower surface of the fourth case member 18. The fourth case member 18 has a take-up spool support hole 94 penetrating therethrough in the up-down direction. The take-up spool 76 is rotatably supported by the take-up spool support hole 94 while the other end portion of the take-up spool 76 is engaged in the take-up spool support hole 94. As illustrated in FIG. 2, the take-up spool 76 has a coupling hole 96 at the other end thereof. The coupling hole 96 of the take-up spool 76 is exposed from the lower surface of the fourth case member 18 through the take-up spool support hole 94. When the cassette 10 is mounted on the printing device 102, a take-up spool drive shaft 108 of the printing device 102 is inserted into the coupling hole 96 and coupled to the take-up spool 76. In such a state, the take-up spool 76 is rotationally driven by the take-up spool drive shaft 108. The fourth case member 18 includes a cylindrical support projection 97. The support projection 97 is coupled to the other end of the feed spool 70 to support the feed spool 70 rotatably.

The fourth case member 18 has a roller exposure hole 98 at a position corresponding to the roller support hole 82 of the third case member 16. The roller exposure hole 98 allows a shaft end of the roller 80 to be exposed. As illustrated in FIG. 2, the roller 80 has a coupling portion 80*a* at an end thereof closer to the fourth case member 18 than the opposite end thereof to the fourth case member 18. The coupling portion 80*a* of the roller 80 is exposed from the lower surface of the fourth case member 18 through the roller exposure hole 98. When the cassette 10 is mounted on the printing device 102, a roller drive shaft 110 of the printing device 102 is coupled to the coupling portion 80*a*. In such a state, the roller 80 is rotationally driven by the roller drive shaft 110. As illustrated in FIGS. 12 and 13, the fourth case member 18 has a U-shaped cutout 18*a* corresponding to the recess wall 16*c*. The recess wall 16*c* and the cutout 18*a* define the recess 99.

FIG. 14 illustrates the lower surface of the third case member 16 in a state where the cassette 10 is mounted on the cassette mounting portion 104 of the printing device 102. As described above, the printing tape 22 is drawn from the printing tape roll 26 and is routed such that the printing tape 22 extends in the inclined manner from the first space S1 of the tape case 20 to the second space S2 of the ribbon case 21 via the through hole 52 and the through hole 58. Thus, FIG. 14 illustrates a particular portion of the printing tape 22 extending in the third case member 16 from the through hole 58 defined at the rear end portion of the third case member 16. As illustrated in FIG. 14, the printing tape 22 and the laminating tape 60 are nipped between the roller 80 and a pressing roller 118 of the printing device 102. As the roller 80 is driven, the printing tape 22 and the laminating tape 60 are drawn from the printing tape roll 26 and the laminating tape roll 64, respectively. As the take-up spool 76 is driven, the ink ribbon 68 is drawn from the ink ribbon roll 72 and taken up by the take-up spool 76. The printing tape 22 is indicated by a double-dotted-and-dashed line. The laminating tape 60 is indicated by a dashed line. The ink ribbon 68 is indicated by a dotted-and-dashed line.

As illustrated in FIG. 14, the ink ribbon 68 is discharged from the ribbon case 21 through an outlet 130 of the ribbon case 21, that is, through the outlet 130 of the third case member 16 of the cassette 10, toward the printing position P together with the printing tape 22. At the printing position P between the print head 106 and the platen roller 116, the printing tape 22 is pressed to the print head 106 via the ink ribbon 68. In this state, heating elements disposed at a surface of the print head 106 are selectively driven to generate heat locally, whereby some of ink 68*a* provided on an entire surface of the ink ribbon 68 is transferred to the printing tape 22, and characters, symbols, and other representations are printed on the printing tape 22. The used ink ribbon 68 that has passed the printing position P is conveyed into the ribbon case 21 through an inlet 132 of the ribbon case 21 and is taken up by the take-up spool 76. The transparent laminating tape 60 is pressed and adhered to the printed surface of the printing tape 22 that has passed the printing position P by the roller 80 and the pressing roller 118 of the printing device 102. The printed surface of the printing tape 22 is thus protected by the laminating tape 60.

FIG. 15 schematically illustrates a laminate of the printing tape 22 and the laminating tape 60 discharged from the cassette 10. The laminating tape 60 is adhered to the to-be-printed tape 22*a*, that is, a printed surface, of the printing tape 22. The laminating tape 60 includes the transparent film 60*a* with the adhesive 60*b* applied to the one side of the transparent film 60*a* entirely. Thus, the ink 68*a* transferred to the printed surface of the printing tape 22 is protected. In FIG. 15, not all components 22*a* to 22*c*, 60*a*, 60*b*, and 68*a* of the laminate are accurately illustrated in size or proportion.

Figure 16:
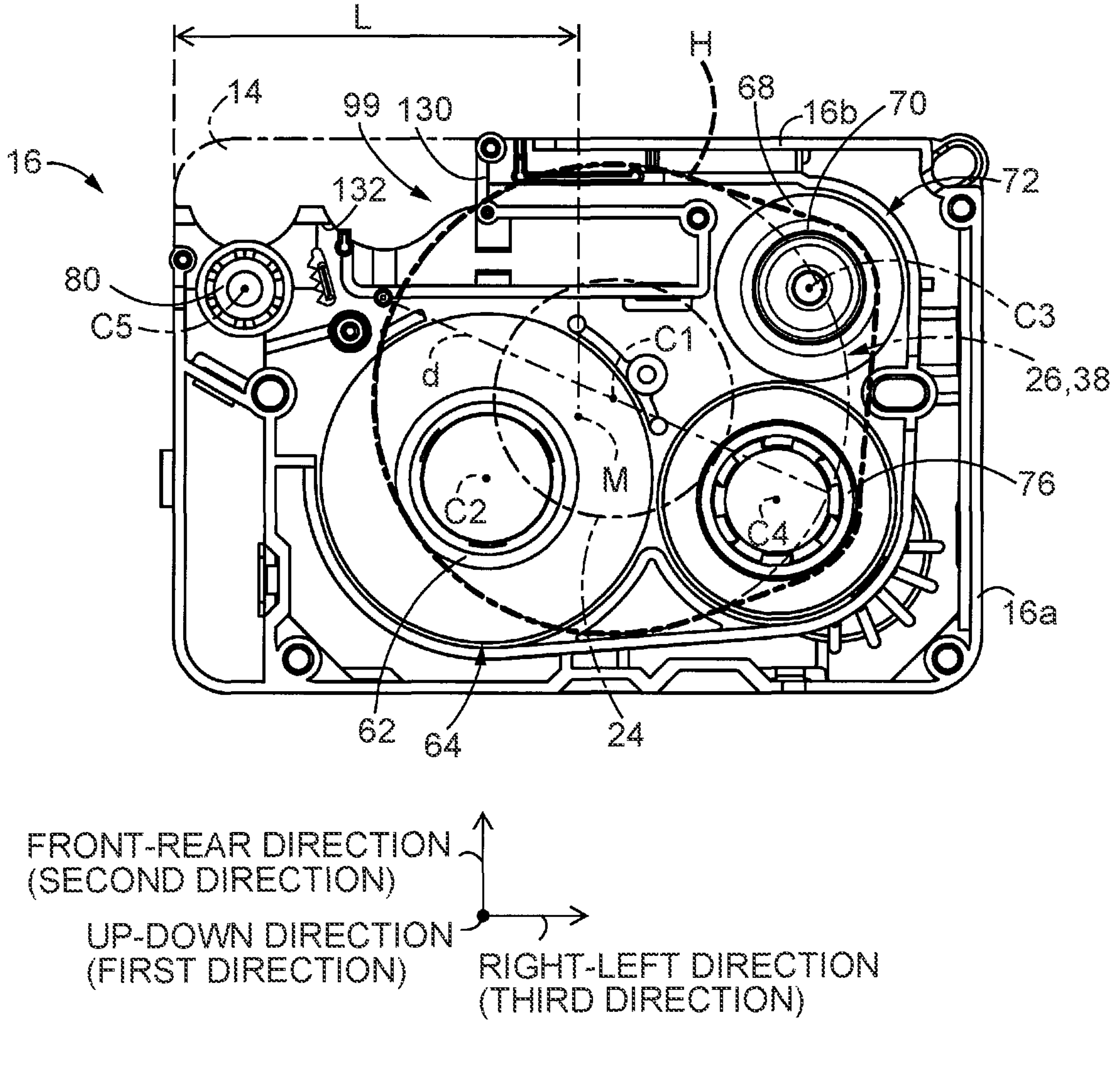
FIG. 16 is a plan view of the cassette of FIG. 1, illustrating relative positions of the printing tape roll, the laminating tape roll, the ink ribbon roll, and the take-up spool.

FIG. 16 illustrates the lower surface of the third case member 16. The laminating tape roll 64, the ink ribbon roll 72, the take-up spool 76, and the roller 80 are disposed in the second space S2 defined between the third case member 16 and the fourth case member 18, that is, in the ribbon case 21. As described above, the ribbon case 21 is disposed below the tape case 20 in the up-down direction in a stacked manner. In a case where the printing tape roll 26 and the spacer films 38 accommodated in the tape case 20 are projected in the up-down direction onto a projection plane extending in the front-rear direction and the right-left direction in the second space S2, the projected contours of the printing tape roll 26 and the spacer films 38 are indicated by a dotted-and-dashed line in FIG. 16. The spacer films 38 have the same diameter as the diameter of the printing tape roll 26. In FIG. 16, thus, the dotted-and-dashed line indicates the printing tape roll 26 only. As illustrated in FIG. 16, the laminating tape roll 64, the ink ribbon roll 72, and the take-up spool 76 overlap the printing tape roll 26 in the up-down direction. At least a portion of the laminating tape roll 64 and at least a portion of the laminating tape spool 62 overlap the printing tape roll 26 in the up-down direction. More specifically, the portion of the laminating tape roll 64 and the portion of the laminating tape spool 62 both overlap the printing tape spool 24 and the printing tape 22 wound around the printing tape spool 24 in the up-down direction.

In FIG. 16, the printing tape roll 26 overlaps the second rotation axis C2 of the laminating tape roll 64, the third rotation axis C3 of the ink ribbon roll 72, and the fourth rotation axis C4 of the take-up spool 76 in the up-down direction. In other words, the second rotation axis C2 of the laminating tape roll 64, the third rotation axis C3 of the ink ribbon roll 72, and the fourth rotation axis C4 of the take-up spool 76 are located within a projected area of the printing tape roll 26 projected in the up-down direction. The third rotation axis C3 also is also the rotation axis of the feed spool 70. The fourth rotation axis C4 is also the rotation axis of the take-up spool 76. A portion of the laminating tape roll 64 and the laminating tape spool 62 both overlap the printing tape roll 26 and the spacer films 38 in the up-down direction. At least a portion of the feed spool 70, at least a portion of the ink ribbon roll 72, at least a portion of the take-up spool 76, at least a portion of the ink ribbon 68 taken up by the take-up spool 76, and at least a used portion of the ink ribbon 68 that has passed the printing position P overlap the printing tape roll 26 and the spacer films 38 in the up-down direction. In other words, at least a portion of each of the laminating tape roll 64, the laminating tape spool 62, the feed spool 70, and the ink ribbon roll 72 are located within the projected areas of the printing tape roll 26 and the spacer films 38 projected in the up-down direction.

In FIG. 16, a distance between the second rotation axis C2 of the laminating tape roll 64 and the third rotation axis C3 of the ink ribbon roll 72 is greater than a distance between the second rotation axis C2 of the laminating tape roll 64 and the fourth rotation axis C4 of the take-up spool 76 and a distance between the third rotation axis C3 of the ink ribbon roll 72 and the fourth rotation axis C4 of the take-up spool 76. The distance between the second rotation axis C2 of the laminating tape roll 64 and the fourth rotation axis C4 of the take-up spool 76 is greater than the distance between the third rotation axis C3 of the ink ribbon roll 72 and the fourth rotation axis C4 of the take-up spool 76.

In FIG. 16, the first rotation axis C1 of the printing tape roll 26 is located in the proximity of an intermediate point in a straight line connecting between the second rotation axis C2 of the laminating tape roll 64 and the third rotation axis C3 of the ink ribbon roll 72. The first rotation axis C1 overlaps the laminating tape roll 64 in the front-rear direction and the right-left direction. In other words, the rotation axis of the printing tape roll 26, that is, the rotation axis of the printing tape spool 24, overlaps the laminating tape roll 64 in the up-down direction. The fourth rotation axis C4 of the take-up spool 76 is located opposite to the recess 99 with respect to the straight line. A distance between the fourth rotation axis C4 and the first rotation axis C1 is greater than a distance between the third rotation axis C3 and the first rotation axis C1 and a distance between the second rotation axis C2 and the first rotation axis C1.

The take-up spool 76, at least a portion of the ink ribbon 68 taken up by the take-up spool 76, and at least a portion of the ink ribbon 68 that has passed the printing position P and extends between the inlet 132 and a take-up position overlap the printing tape roll 26, the printing tape spool 24, and the spacer films 38 in the up-down direction. At the take-up position, the take-up spool 76 takes up the ink ribbon 68.

As illustrated in FIGS. 1 and 2, the outer peripheral wall of the third case member 16 partially constitutes the outer peripheral wall of the cassette 10. The third case member 16 has dimensions in the front-rear direction and the right-left direction equal to dimensions of the cassette 10 in the front-rear direction and the right-left direction. Therefore, the center of the third case member 16 in the front-rear direction and the right-left direction coincides with the center of the cassette 10 in the front-rear direction and the right-left direction. As illustrated in FIG. 16, a distance between a center position M and the first rotation axis C1 of the printing tape roll 26 is less than a distance between the center position M and the second rotation axis C2 of the laminating tape roll 64, a distance between the center position M and the third rotation axis C3 of the ink ribbon roll 72, and a distance between the center position M and the fourth rotation axis C4 of the take-up spool 76 in the front-rear direction and the right-left direction (e.g., the directions orthogonal to the up-down direction). The center position M is a center of the cassette 10 in the front-rear direction and the right-left direction. That is, in the directions orthogonal to the up-down direction, the first rotation axis C1 is closer to the center of the cassette 10 than the second rotation axis C2, the third rotation axis C3, and the fourth rotation axis C4 to the center of the cassette 10.

The printing tape roll 26 has a diameter greater than the diameter of the laminating tape roll 64. A size of the printing tape roll 26 in the front-rear direction orthogonal to the up-down direction and in the right-left direction orthogonal to the up-down direction and the front-rear direction (e.g., a diameter d) is greater than a dimension L that is equal to half of the dimension of the cassette 10 in the front-rear direction and the right-left direction, for example, half of the long side portions of the cassette 10.

Figure 17:
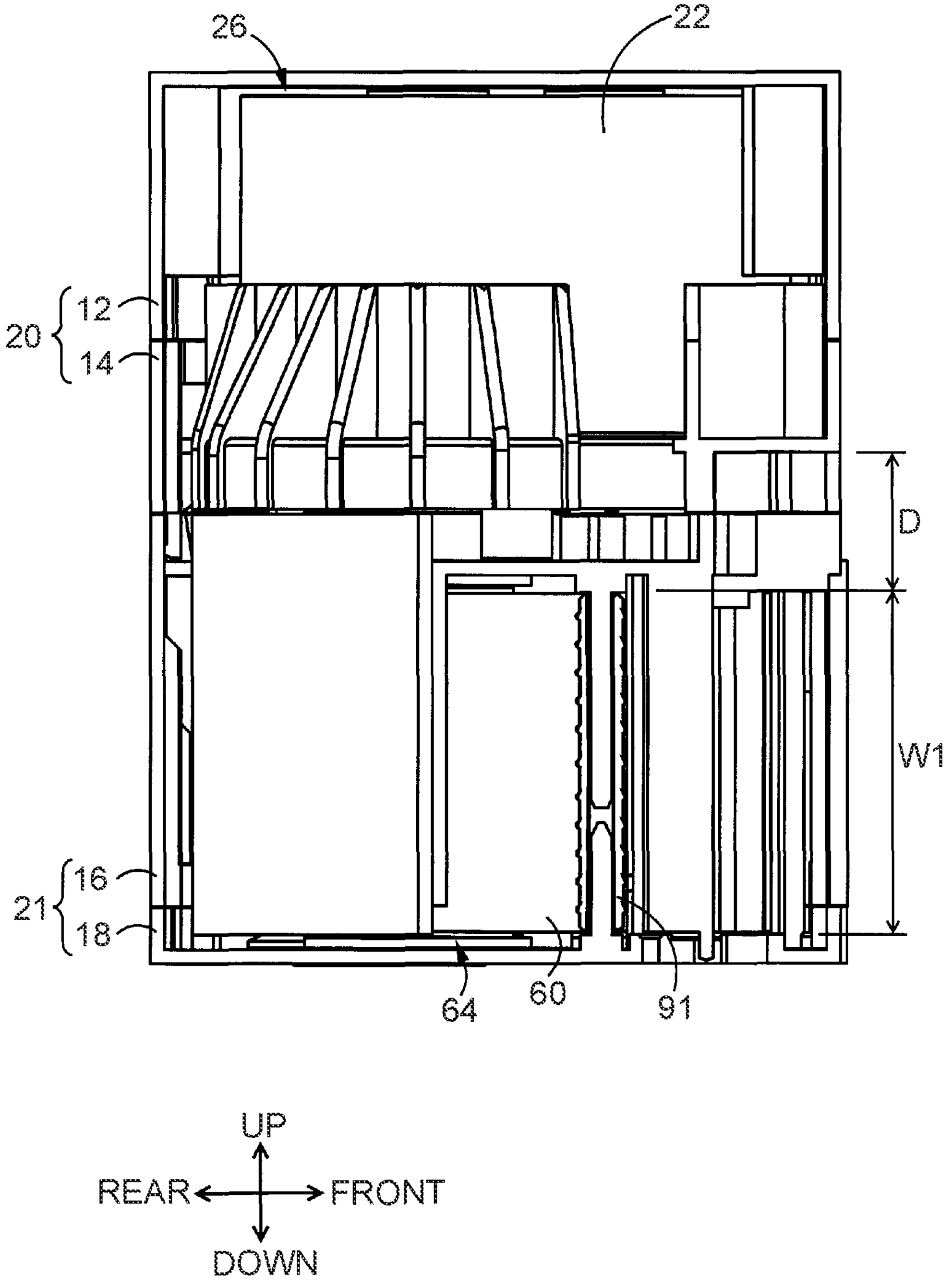
FIG. 17 is a sectional view taken along line XVII-XVII of FIG. 6.

FIG. 17 is a sectional view taken along line XVII-XVII of FIG. 6. In the up-down direction, a distance D between one end (e.g., a lower end) of the printing tape roll 26 and the other end (e.g., an upper end) of the laminating tape roll 64 is less than a width W1 of the laminating tape 60. The printing tape 22 and the laminating tape 60 have the same width. Thus, the distance D is less than the width of the printing tape roll 26.

In each of the front-rear direction orthogonal to the up-down direction and the right-left direction orthogonal to the up-down direction and the front-rear direction, the distance between the center M and the first rotation axis C1 is less than the distance between the center M and the second rotation axis C2. The first rotation axis C1 refers to the rotation axis of the printing tape roll 26. The second rotation axis C2 refers to the rotation axis of the laminating tape roll 64. The printing tape roll 26 has a diameter greater than the diameter of the laminating tape roll 64. A dimension in the front-rear direction of a convex envelope H defined by a tangent connecting between the peripheral circles of the printing tape roll 26, the take-up spool 76, and the feed spool 70 around which the ink ribbon 68 is wound is greater than half of the dimension of the third case member 16 in the front-rear direction. The convex envelope H has a dimension in the right-left direction greater than half of the dimension of the third case member 16 in the right-left direction. As illustrated in FIG. 2, the outer peripheral wall of the third case member 16 partially constitutes the outer peripheral wall of the cassette 10. Thus, it may be also expressed that the dimension of the convex envelope H in each of the front-rear direction and the right-left direction is greater than half of the dimension of the cassette 10 in each corresponding one of the front-rear direction and the right-left direction.

Figure 18:
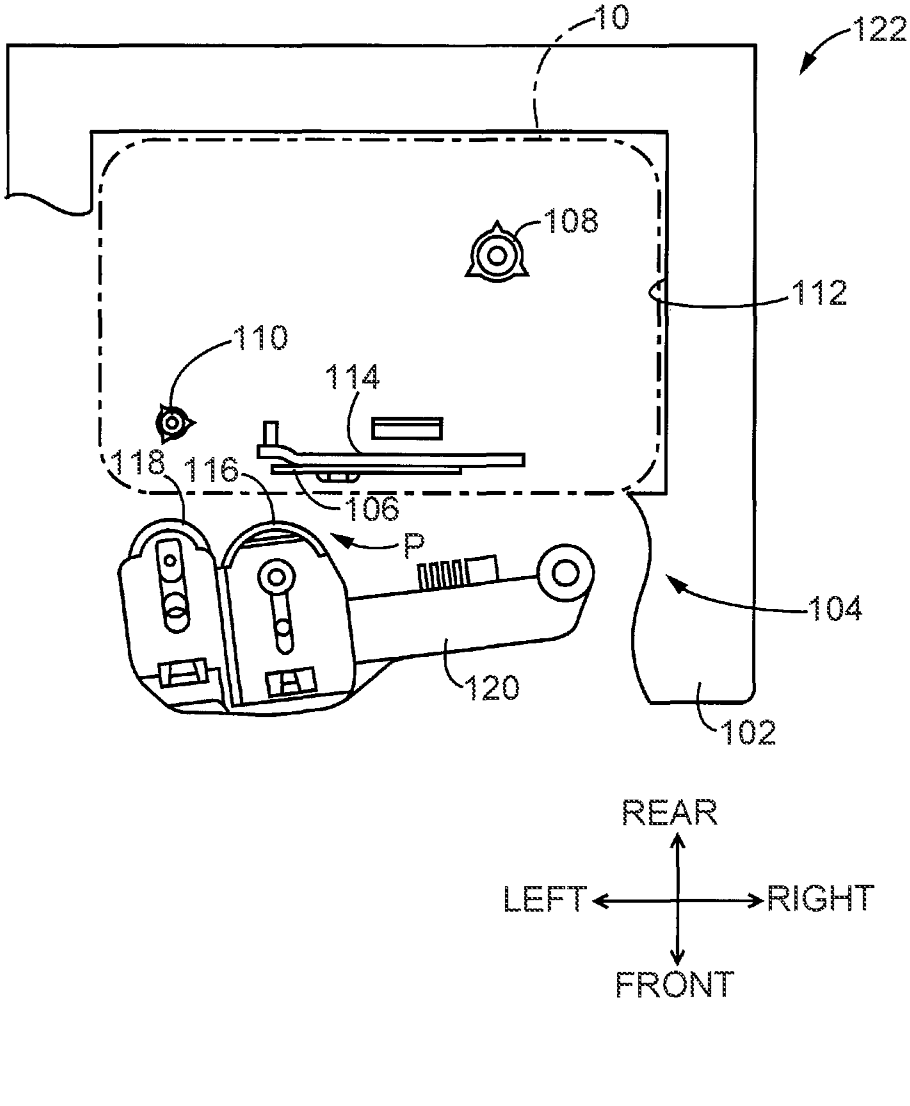
FIG. 18 illustrates a cassette mounting portion of a printing device on which cassette of FIG. 1 is to be mounted.

FIG. 18 illustrates the cassette mounting portion 104 that is a part of the printing device 102 included in a printing system 122. The cassette mounting portion 104 includes a positioning hole 112, the take-up spool drive shaft 108, and the roller drive shaft 110. The positioning hole 112 has a rectangular shape and positions the cassette 10 inserted therein. The take-up spool drive shaft 108 and the roller drive shaft 110 stand on a bottom of the positioning hole 112. The positioning hole 112 functions as an accommodating portion for accommodating a portion of the ribbon case 21 that is a lower case of the cassette 10. The take-up spool drive shaft 108 and the roller drive shaft 110 are rotationally driven in the same direction by a stepping motor via a gearing system. The cassette mounting portion 104 includes a head holding plate 114 and a platen holding member 120. The head holding plate 114 stands on the bottom of the positioning hole 112 and holds the thermal-type print head (e.g., a thermal print head) 106 fixedly attached thereto. The platen roller 116 and the pressing roller 118 are rotatably disposed at a distal end portion of the platen holding member 120. The platen holding member 120 is pivotable about its proximal end. The head holding plate 114 is, for example, an aluminum metal plate and also serves as a heat sink of the print head 106.

As the cassette 10 is mounted on the cassette mounting portion 104 of the printing device 102, the take-up spool drive shaft 108 and the roller drive shaft 110 standing at the cassette mounting portion 104 are to be coupled to the take-up spool 76 and the roller 80, respectively. As a cover of the printing device 102 is closed with the cassette 10 mounted on the cassette mounting portion 104, the platen holding member 120 pivots about the proximal end thereof so that the platen roller 116 and the pressing roller 118 are pressed against the print head 106 and the roller 80 of the cassette 10, respectively. The printing device 102 and the cassette 10 constitute the printing system 122.

According to the cassette 10 of the illustrative embodiment, the cassette 10 includes the printing tape roll 26 into which the printing tape 22 as a medium to be printed is wound; the feed spool 70 that is rotatable and around which the ink ribbon 68 to be used for printing on the printing tape 22 is wound; and the take-up spool 76 that is rotatable to take up the ink ribbon 68 fed from the feed spool 70. The feed spool 70 and the take-up spool 76 are located on the lower side in the up-down direction with respect to the printing tape roll 26. The up-down direction is the width direction of the ink ribbon 68 wound around the feed spool 70. At least a portion of the feed spool 70 and at least a portion of the take-up spool 76 overlap the printing tape roll 26 in the up-down direction. The printing tape roll 26, the feed spool 70, and the take-up spool 76 are thus separately located in the up-down direction and the at least a portion of the feed spool 70 and the at least a portion of the take-up spool 76 overlap the printing tape roll 26 in the up-down direction, whereby the cassette 10 may be downsized in a direction orthogonal to the up-down direction.

According to the cassette 10 of the illustrative embodiment, the fourth rotation axis C4 that is the rotation axis of the take-up spool 76 overlaps the printing tape roll 26 in the up-down direction. The cassette 10 may be thus downsized in a direction orthogonal to the up-down direction as compared with a case where the fourth rotation axis C4 of the take-up spool 76 does not overlap the printing tape roll 26 in the up-down direction.

According to the cassette 10 of the illustrative embodiment, the third rotation axis C3 that is the rotation axis of the feed spool 70 overlaps the printing tape roll 26 in the up-down direction. The cassette 10 may be thus downsized in a direction orthogonal to the up-down direction as compared with a case where the third rotation axis C3 of the feed spool 70 does not overlap the printing tape roll 26 in the up-down direction.

According to the cassette 10 of the illustrative embodiment, in the printing tape roll 26, the printing tape 22 is wound around the rotatable printing tape spool 24. At least a portion of the ink ribbon 68 taken up by the take-up spool 76 overlaps the printing tape roll 26 in the up-down direction. The cassette 10 may be thus downsized in a direction orthogonal to the up-down direction as compared with a case where at least a portion of the ink ribbon 68 taken up by the take-up spool 76 does not overlap the printing tape roll 26 in the up-down direction.

According to the cassette 10 of the illustrative embodiment, at least a portion of the take-up spool 76 overlaps the printing tape spool 24 in the up-down direction. The cassette 10 may be thus downsized in a direction orthogonal to the up-down direction as compared with a case where at least a portion of the take-up spool 76 does not overlap the printing tape spool 24 in the up-down direction.

According to the cassette 10 of the illustrative embodiment, in the printing tape roll 26, the printing tape 22 is wound around the rotatable printing tape spool 24. In the direction orthogonal to the up-down direction, the distance between the fourth rotation axis C4 that is the rotation axis of the take-up spool 76 and the first rotation axis C1 that is the rotation axis of the printing tape spool 24 is less than the distance between the third rotation axis C3 that is the rotation axis of the feed spool 70 and the first rotation axis C1 that is the rotation axis of the printing tape spool 24. The cassette 10 may be thus downsized in a direction orthogonal to the up-down direction as compared with a case where the distance between the fourth rotation axis C4 that is the rotation axis of the take-up spool 76 and the first rotation axis C1 that is the rotation axis of the printing tape spool 24 is greater than the distance between the third rotation axis C3 that is the rotation axis of the feed spool 70 and the first rotation axis C1 that is the rotation axis of the printing tape spool 24.

According to the cassette 10 of the illustrative embodiment, in the front-rear direction orthogonal to the up-down direction and in the right-left direction orthogonal to the up-down direction and the front-rear direction, the distance between the center position M and the first rotation axis C1 is less than each of the distance between the fourth rotation axis C4 and the center position M and the distance between the third rotation axis C3 and the center position M. The center position M is the center of the cassette 10 in the front-rear direction and the right-left direction. The first rotation axis C1 is the rotation axis of the printing tape roll 26. The fourth rotation axis C4 is the rotation axis of the take-up spool 76. The third rotation axis C3 is the rotation axis of the feed spool 70. The diameter of the printing tape roll 26 is greater than the diameter of the laminating tape roll 64. Thus, an larger amount of overlap between the printing tape roll 26 and the feed spool 70 may be achieved as compared with a case where the distance between the center position M and the rotation axis of the printing tape roll 26 is not less than the distance between the rotation axis of the take-up spool 76 and the center position M and the distance between the rotation axis of the feed spool 70 and the center position M, whereby the cassette 10 may be downsized in a direction orthogonal to the up-down direction.

According to the cassette 10 of the illustrative embodiment, the dimension in the front-rear direction of the convex envelope H defined by the tangent contacting the peripheral circles of the printing tape roll 26, the take-up spool 76, and either one of the ink ribbon roll 72 or the feed spool 70 is greater than half of the dimension of the cassette 10 in the front-rear direction orthogonal to the up-down direction. The dimension of the convex envelope H in the right-left direction is also greater than half of the dimension of the cassette 10 in the right-left direction orthogonal to the up-down direction and the front-rear direction. The printing tape roll 26, the take-up spool 76, and the feed spool 70 thus occupy a large portion of the space in the cassette 10, whereby the cassette 10 may be thus downsized in a direction orthogonal to the up-down direction.

According to the cassette 10 of the illustrative embodiment, the cassette 10 includes the tape case 20 and the ribbon case 21. The tape case 20 accommodates the printing tape roll 26. The ribbon case 21 is located on the lower side in the up-down direction with respect to the tape case 20 and accommodates the feed spool 70 and the take-up spool 76. The ribbon case 21 has the outlet 130 and the inlet 132. The outlet 130 allows the printing tape 22 fed from the printing tape roll 26 and the ink ribbon 68 wound around the feed spool 70 to be discharged from the ribbon case 21 therethrough. The inlet 132 allows the ink ribbon 68 that has been discharged from the ribbon case 21 through the outlet 130 to be conveyed into the ribbon case 21 therethrough. The ink ribbon 68 that has been conveyed into the ribbon case 21 through the inlet 132 is taken up by the take-up spool 76. The ink ribbon 68 that has been once discharged from the ribbon case 21 through the outlet 130 and then conveyed into the ribbon case 21 through the inlet 132 is taken up by the take-up spool 76. The cassette 10 thus does not need to have a space for defining a return path for the ink ribbon 68 in the ribbon case 221, whereby the cassette 10 may be thus downsized in a direction orthogonal to the up-down direction as compared with a case where the ink ribbon 68 is taken up by the take-up spool 76 in a return path defined in the ribbon case 21.

According to the cassette 10 of the illustrative embodiment, a portion of the ink ribbon 68 extending between the inlet 132 and the take-up position at which the ink ribbon 68 is taken up by the take-up spool 76 overlaps the printing tape roll 26 in the up-down direction. The cassette 10 may be thus downsized in a direction orthogonal to the up-down direction as compared with a case where the portion of the ink ribbon 68 extending between the inlet 132 and the take-up position at which the ink ribbon 68 is taken up by the take-up spool 76 does not overlap the printing tape roll 26 in the up-down direction.

According to the cassette 10 of the illustrative embodiment, the ribbon case 21 includes the laminating tape roll 64 into which the laminating tape 60 to be adhered to the printing tape 22 is wound. At least a portion of the laminating tape roll 64 overlaps the printing tape roll 26 in the up-down direction. The cassette 10 may be thus downsized in a direction orthogonal to the up-down direction as compared with a case where at least a portion of the laminating tape roll 64 does not overlap the printing tape roll 26 in the up-down direction.

According to the cassette 10 of the illustrative embodiment, in the printing tape roll 26, the printing tape 22 is wound around the rotatable printing tape spool 24. At least a portion of the laminating tape roll 64 overlaps the printing tape spool 24 in the up-down direction. The cassette 10 may be thus downsized in a direction orthogonal to the up-down direction as compared with a case where at least a portion of the laminating tape roll 64 does not overlap the printing tape spool 24 in the up-down direction.

According to the cassette 10 of the illustrative embodiment, in the laminating tape roll 64, the laminating tape 60 is wound around the rotatable laminating tape spool 62. The rotation axis of the laminating tape spool 62 overlaps the printing tape roll 26 in the up-down direction. The cassette 10 may be thus downsized in a direction orthogonal to the up-down direction as compared with a case where the rotation axis of the laminating tape spool 62 does not overlap the printing tape roll 26 in the up-down direction.

According to the cassette 10 of the illustrative embodiment, in the printing tape roll 26, the printing tape 22 is wound around the rotatable printing tape spool 24. At least a portion of the laminating tape spool 62 overlaps the printing tape spool 24 in the up-down direction. The cassette 10 may be thus downsized in a direction orthogonal to the up-down direction as compared with a case where at least a portion of the laminating tape spool 62 does not overlap the printing tape spool 24 in the up-down direction.

According to the cassette 10 of the illustrative embodiment, the cassette 10 includes the printing tape roll 26 into which the printing tape 22 as the medium to be printed is wound; the feed spool 70 that is rotatable and around which the ink ribbon 68 to be used for printing on the printing tape 22 is wound; the take-up spool 76 that is rotatable to take up the ink ribbon 68 fed from the feed spool 70; and the spacer films 38 that each contact the printing tape roll 26 in the up-down direction that is the width direction of the ink ribbon 68 wound around the feed spool 70. At least a portion of the feed spool 70 and at least a portion of the take-up spool 76 overlap the spacer films 38 in the up-down direction. The cassette 10 may be thus downsized in a direction orthogonal to the up-down direction as compared with a case where the spacer films 38 and the ink ribbon 68 do not overlap each other in the up-down direction.

Second Illustrative Embodiment

Next, a second illustrative embodiment of the disclosure will be described. In the following description, portions common to the illustrative embodiments are denoted by the same reference numerals, and description thereof will be omitted.

Figure 19:
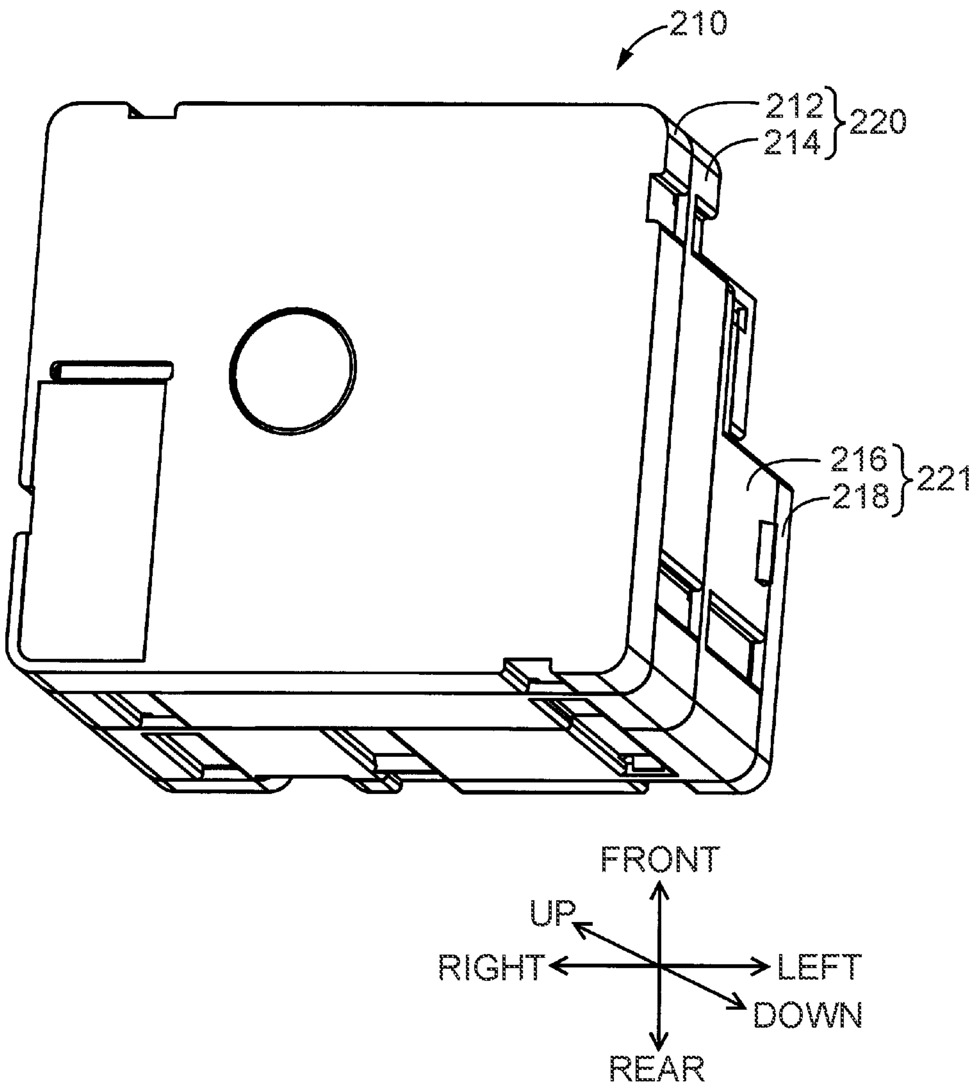
FIG. 19 is a perspective view illustrating an upper surface side of a non-laminated type cassette according to a second illustrative embodiment of the disclosure.
Figure 20:
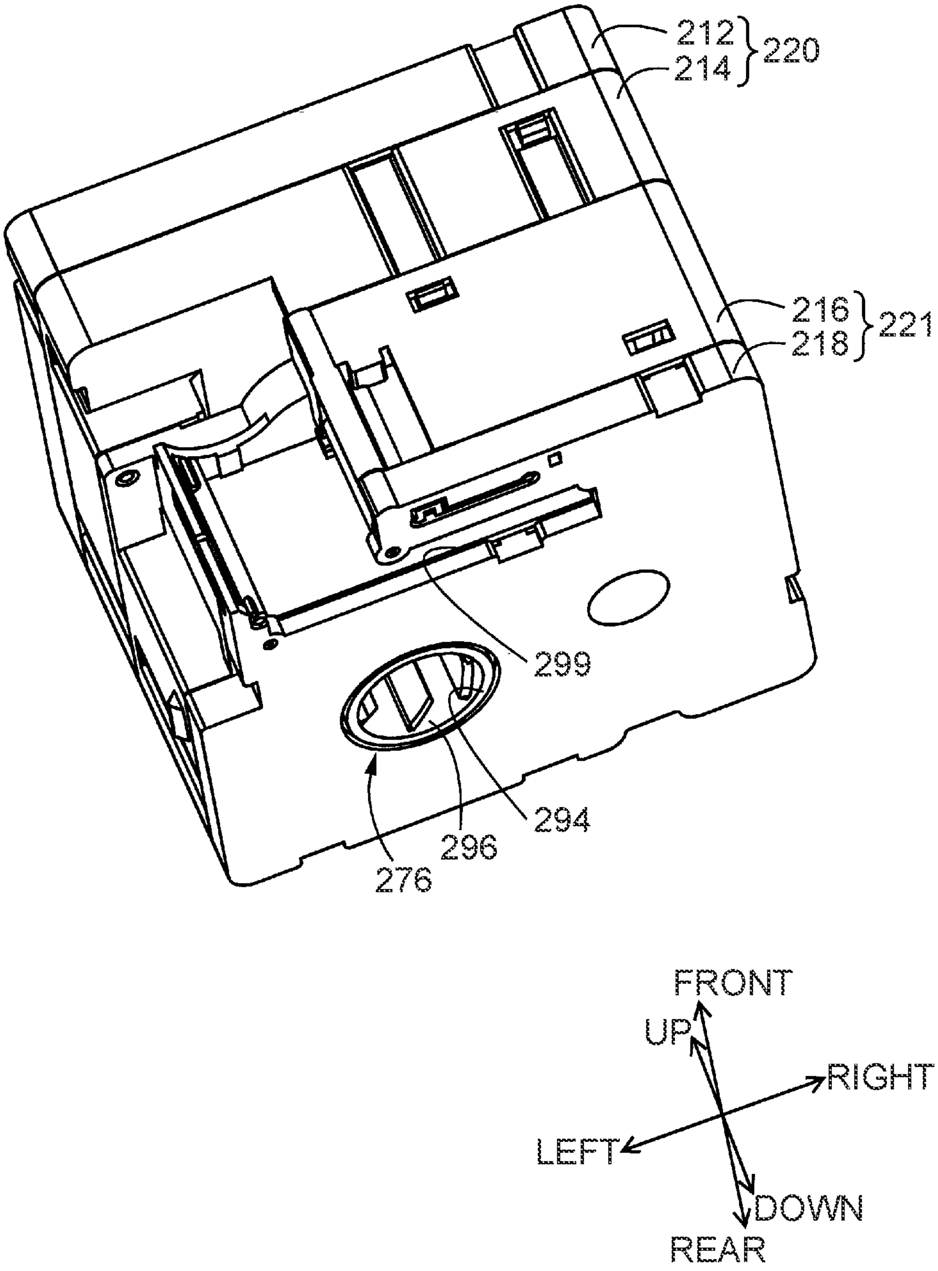
FIG. 20 is a perspective view illustrating a lower surface side of the cassette FIG. 19.
Figure 21:
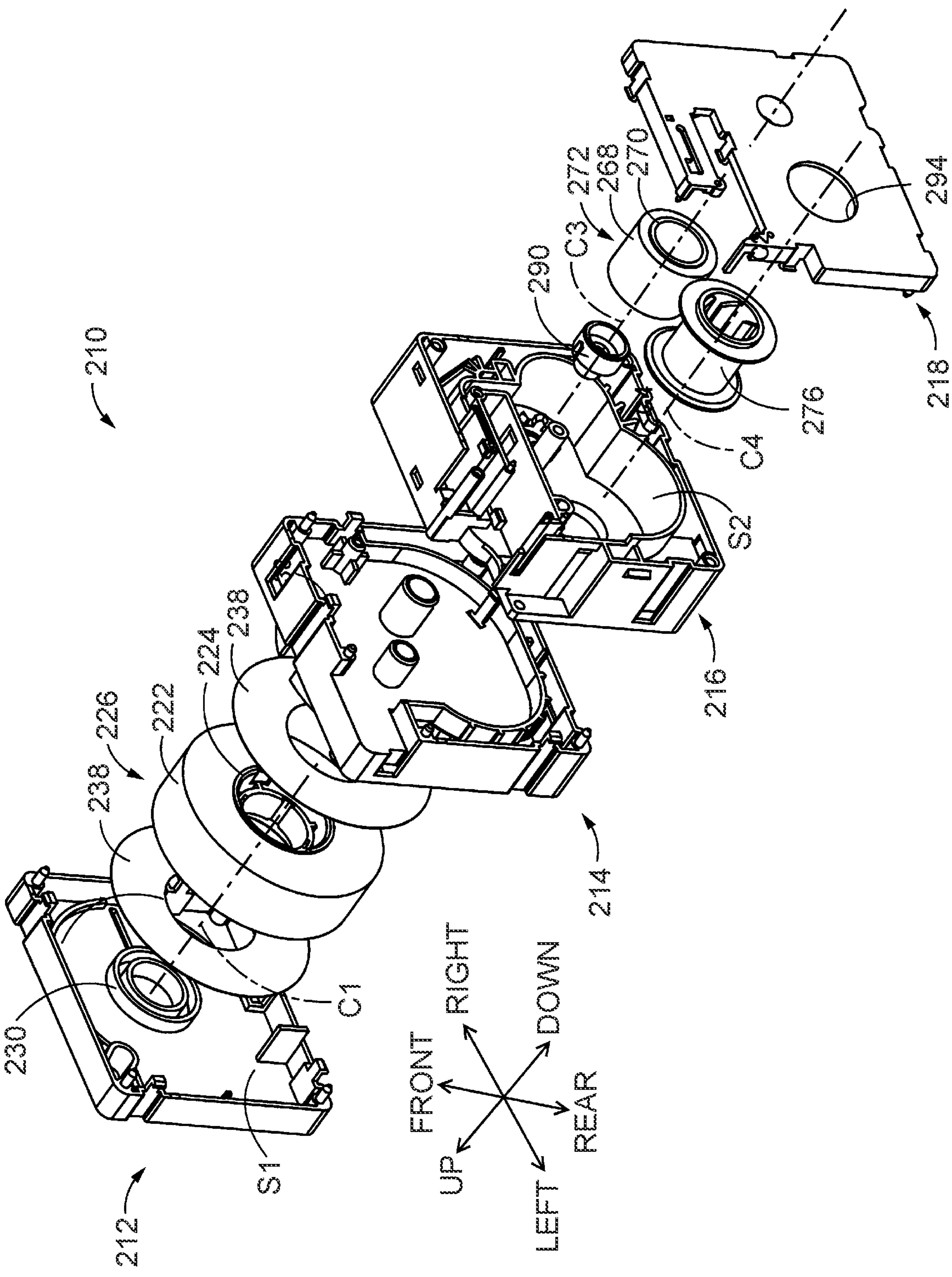
FIG. 21 is a perspective view illustrating a configuration of a case of the cassette of FIG. 19 and an internal configuration of the case of the cassette, wherein a first case member, a second case member, a third case member, and a fourth case member constituting the case are disassembled.

FIG. 19 is a perspective view of a cassette 210 according to the second illustrative embodiment, when viewed from a first side, that is, an obverse surface side, of the cassette 210. In the description of the illustrative embodiment, an upper side, lower side, right side, and left side of FIG. 19 refer to a front side, rear side, left side, and right side of the cassette 210, respectively. An upper left side and a lower right side of FIG. 19 refer to an upper side and a lower side of the cassette 210, respectively. FIG. 20 is a perspective view of the cassette 210, when viewed from a back surface side, that is, the lower surface side, of the cassette 210. The cassette 210 has a rectangular parallelepiped shape as a whole. The cassette 210 is detachably attachable to a printer having a similar configuration to the printing device 102 illustrated in FIG. 18 except that the printer has dimensions slightly different from the dimensions of the printing device 102 and does not include the roller drive shaft 110. In the description below, the printing device 102 of FIG. 18 is used as the printer. The cassette 210 of the illustrative embodiment is a non-laminated type cassette that does not include the laminating tape roll 64 and the roller 80. Thus, the cassette 210 is smaller in size than the cassette 10 that is a laminated-type cassette. FIG. 21 is a disassembled perspective view of the cassette 210, illustrating an internal configuration of the cassette 210, wherein a first case member 212, a second case member 214, a third case member 216, and a fourth case member 218 constituting the cassette 210 are disassembled.

The cassette 210 includes a tape case 220 composed of the first case member 212 and the second case member 214, and a ribbon case 221 composed of the third case member 216 and the fourth case member 218. A direction in which the first case member 212 to the fourth case member 218 are stacked one above another, that is, an up-down direction in FIG. 19 corresponds to the first direction. A front-rear direction in FIG. 19 corresponds to the second direction orthogonal to the first direction. A right-left direction in FIG. 19 corresponds to the third direction orthogonal to the first direction and the second direction.

The ribbon case 221 is located on one side in the up-down direction with respect to the tape case 220. In the illustrative embodiment, the ribbon case 221 is located on a lower side, that is, the one side in the up-down direction with respect to the tape case 220. The tape case 220 has a first space S1 defined therein. The tape case 20 includes, in the first space S1, a printing tape roll 226 into which a printing tape 222 as a medium to be printed is wound. The ribbon case 221 has a second space S2 defined therein. The ribbon case 221 includes an ink ribbon roll 272 in the second space S2.

In the ink ribbon roll 272, an ink ribbon 268 that is a continuous strip is wound around a feed spool 270 such that a width direction of the ink ribbon 68 corresponds to the up-down direction. The ink ribbon 268 is used for printing on the printing tape 222 that is a continuous strip. A radial direction of the ink ribbon roll 272 includes the front-rear direction and the right-left direction. That is, the radial direction is an orthogonal direction orthogonal to the up-down direction. The orthogonal direction includes one or more arbitrary directions parallel to a plane orthogonal to the up-down direction.

The first case member 212, the second case member 214, the third case member 216, and the fourth case member 218 include locking claws 227, fixing holes 228, and positioning projections 229 at appropriate positions of their outer peripheral walls. In the cassette 210, the first case member 212, the second case member 214, the third case member 216, and the fourth case member 218 are fixed to each other in a stacked manner in the up-down direction by engagement between the locking claws 227 and the fixing holes 228 while the first case member 212, the second case member 214, the third case member 216, and the fourth case member 218 are positioned relative to each other by the positioning projections 229. In the illustrative embodiment, an upper surface of each case member 212 to 218 is referred to as an upper or obverse surface, and a lower surface of each case member 212 to 218 is referred to as a lower or back surface.

As illustrated in FIG. 20, the fourth case member 218 of the cassette 210 has a take-up spool support hole 294. The take-up spool support hole 294 penetrates the lower surface of the fourth case member 218 in the up-down direction. The third case member 216 and the fourth case member 218, that is, the ribbon case 221 has a recess 299 at its front surface. When the cassette 210 is mounted on the cassette mounting portion 104 of the printing device 102, the print head 106 disposed at the cassette mounting portion 104 is inserted to the recess 299.

Figure 22:
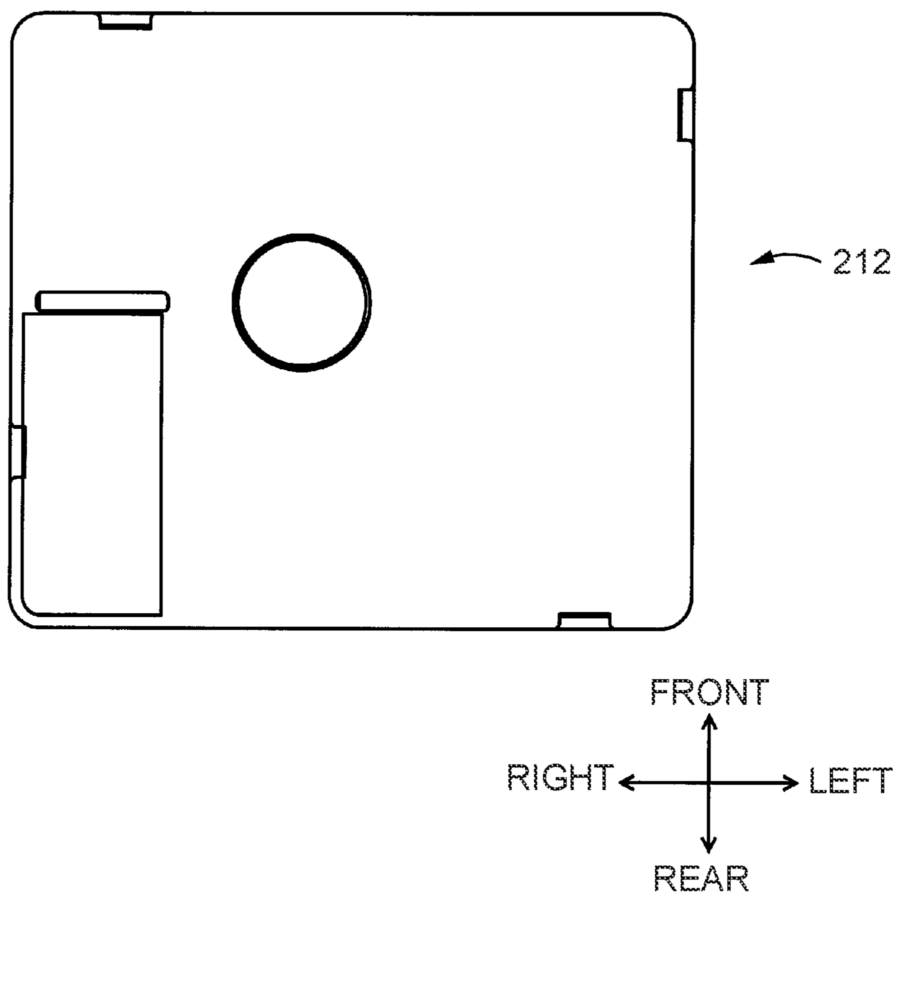
FIG. 22 is a front view illustrating an upper surface side of the first case member of FIG. 19.
Figure 23:
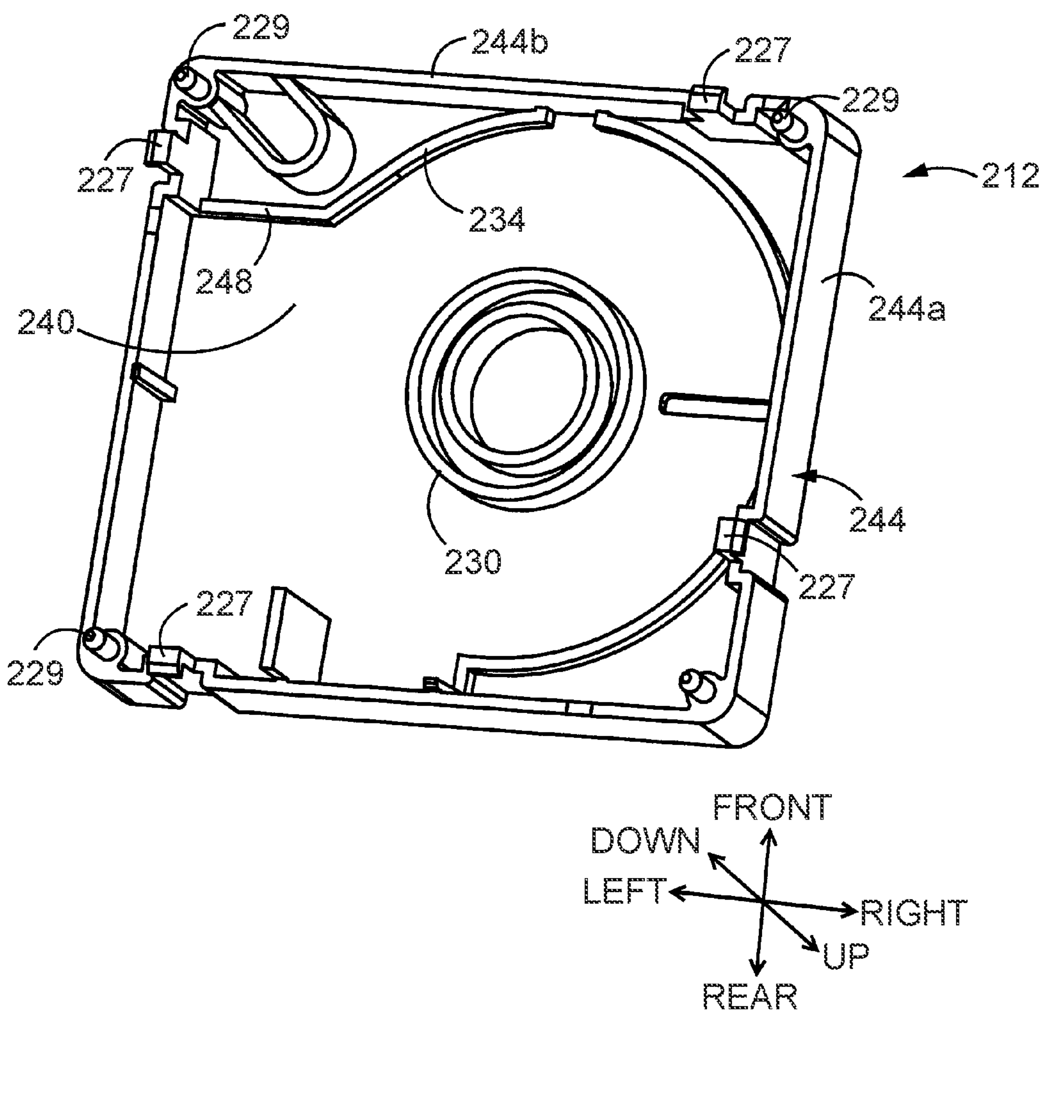
FIG. 23 is a perspective view illustrating a lower surface side of the first case member of FIG. 19.
Figure 24:
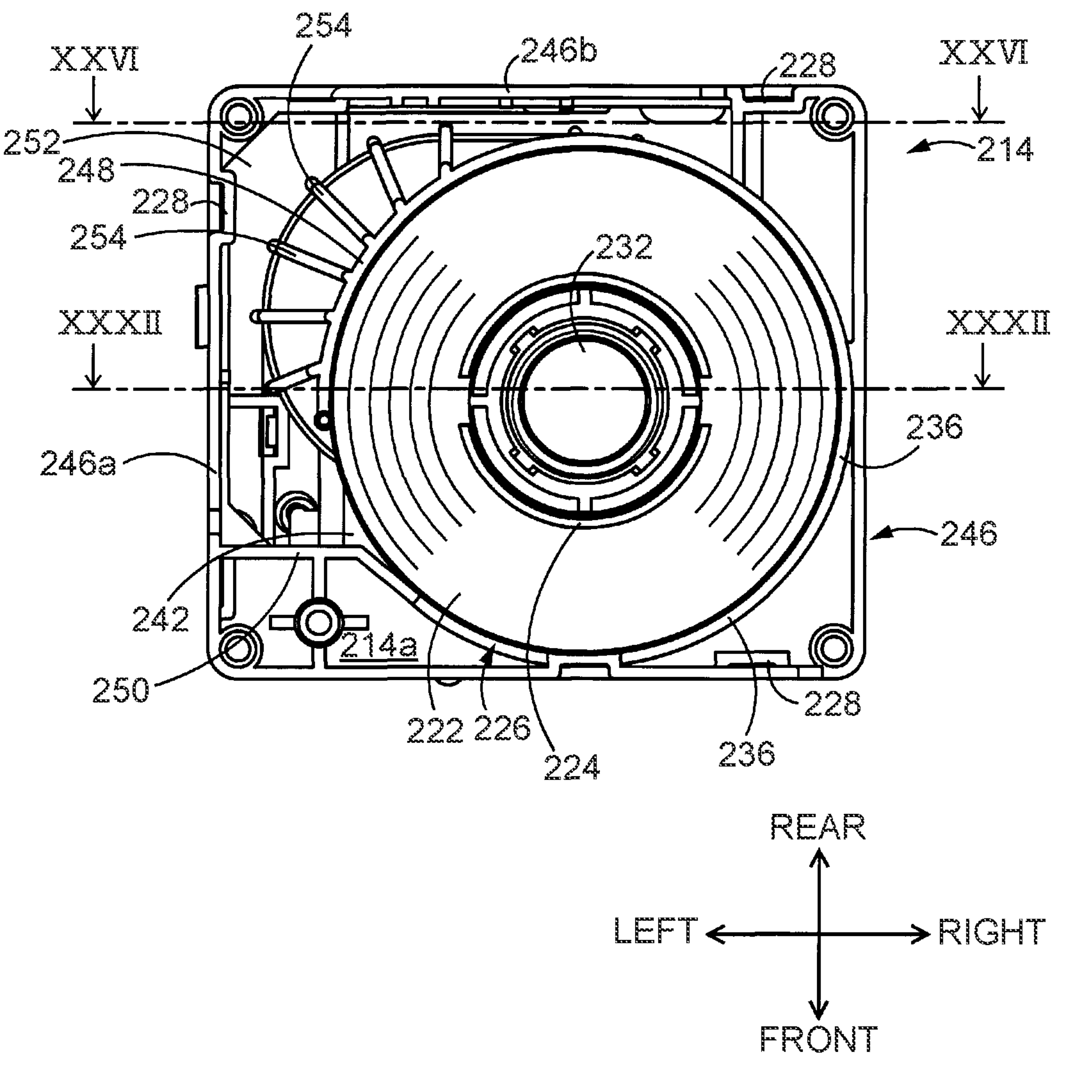
FIG. 24 is a front view illustrating an upper surface side of the second case member of FIG. 19 with a printing tape roll.
Figure 25:
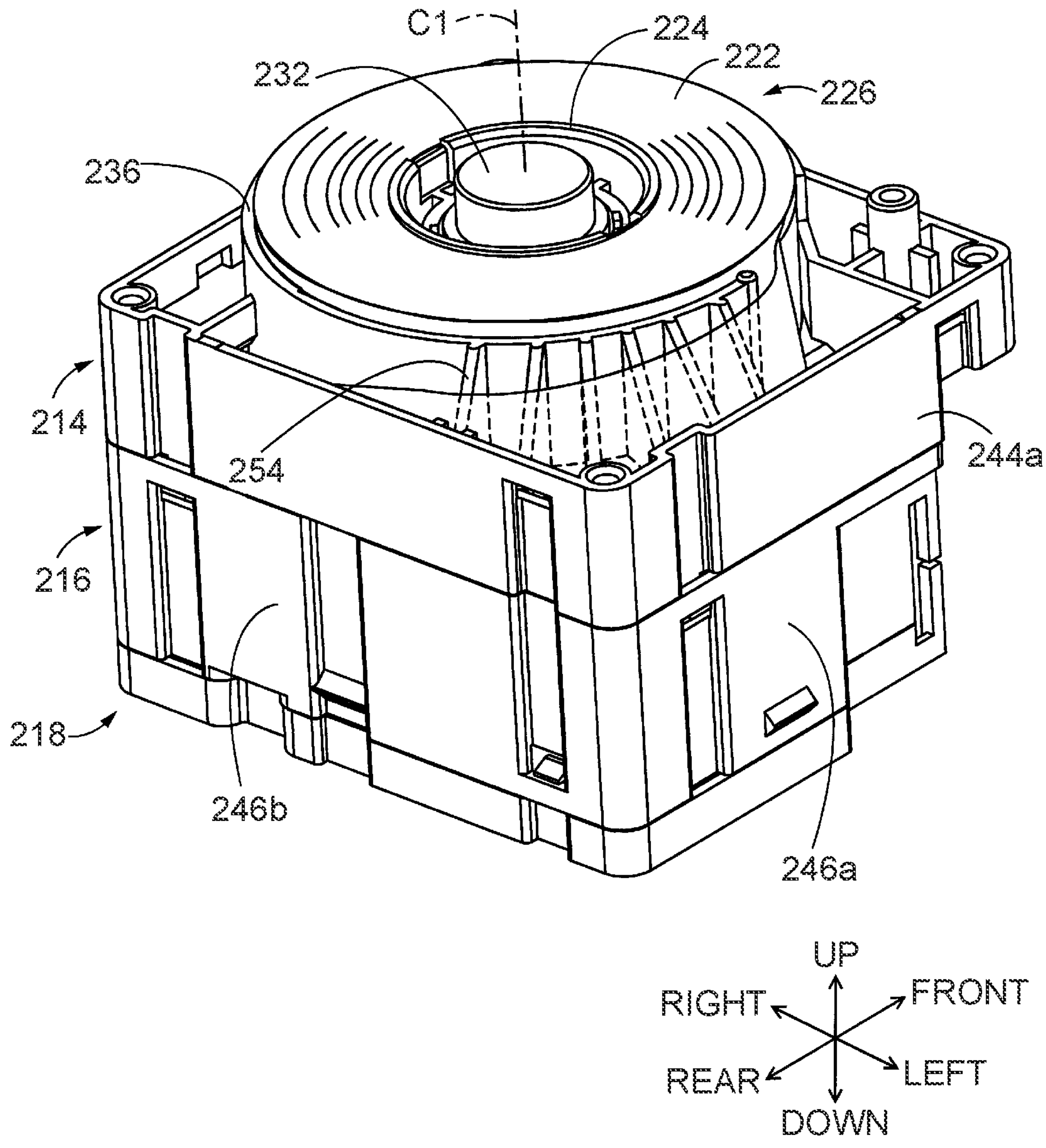
FIG. 25 is a perspective view illustrating the cassette of FIG. 19 with the first case member removed.
Figure 26:
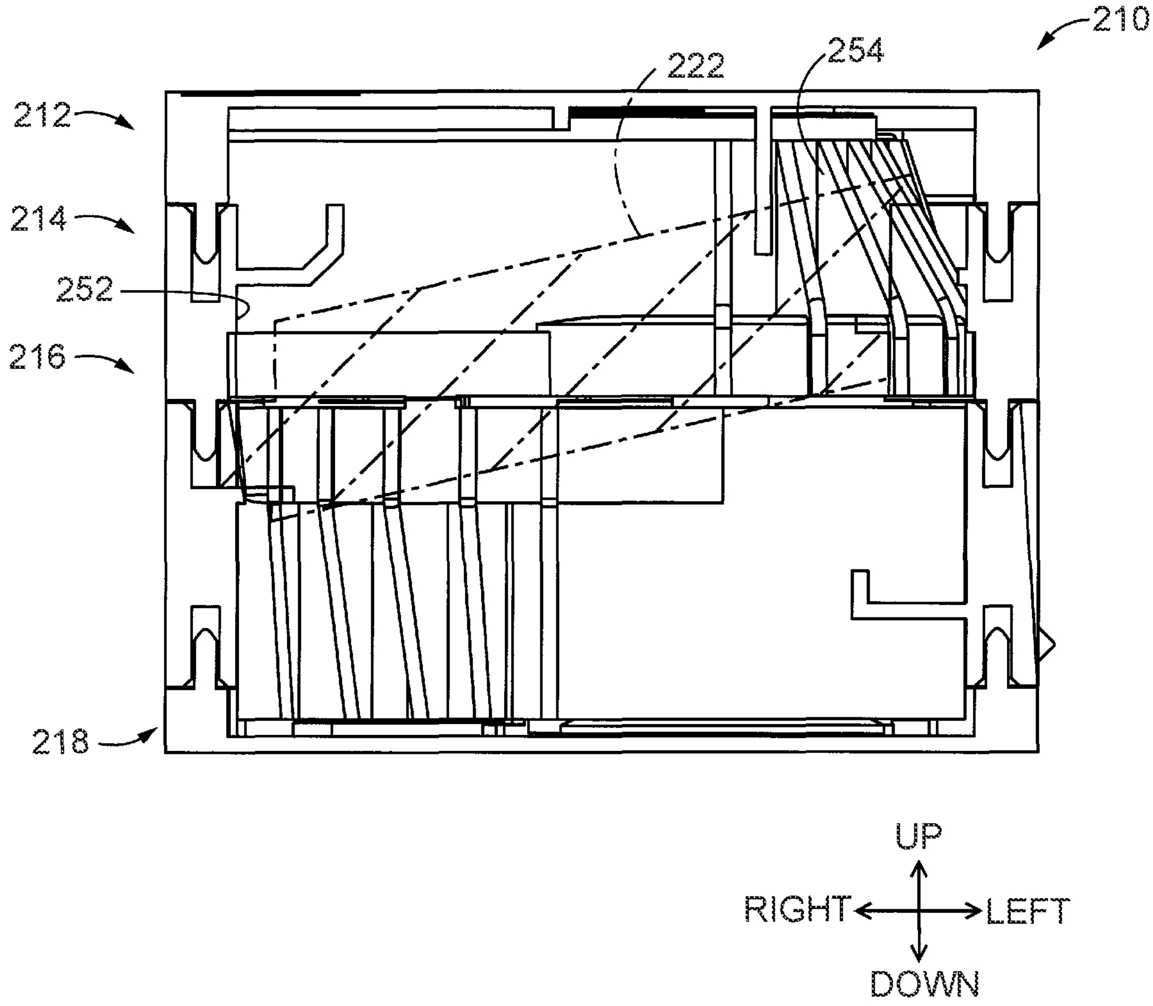
FIG. 26 is a cross sectional view taken along line XXVI-XXVI in FIG. 24, illustrating a state where a printing tape extends from the inside of a tape case to the inside of a ribbon case in the cassette of FIG. 19.
Figure 27:
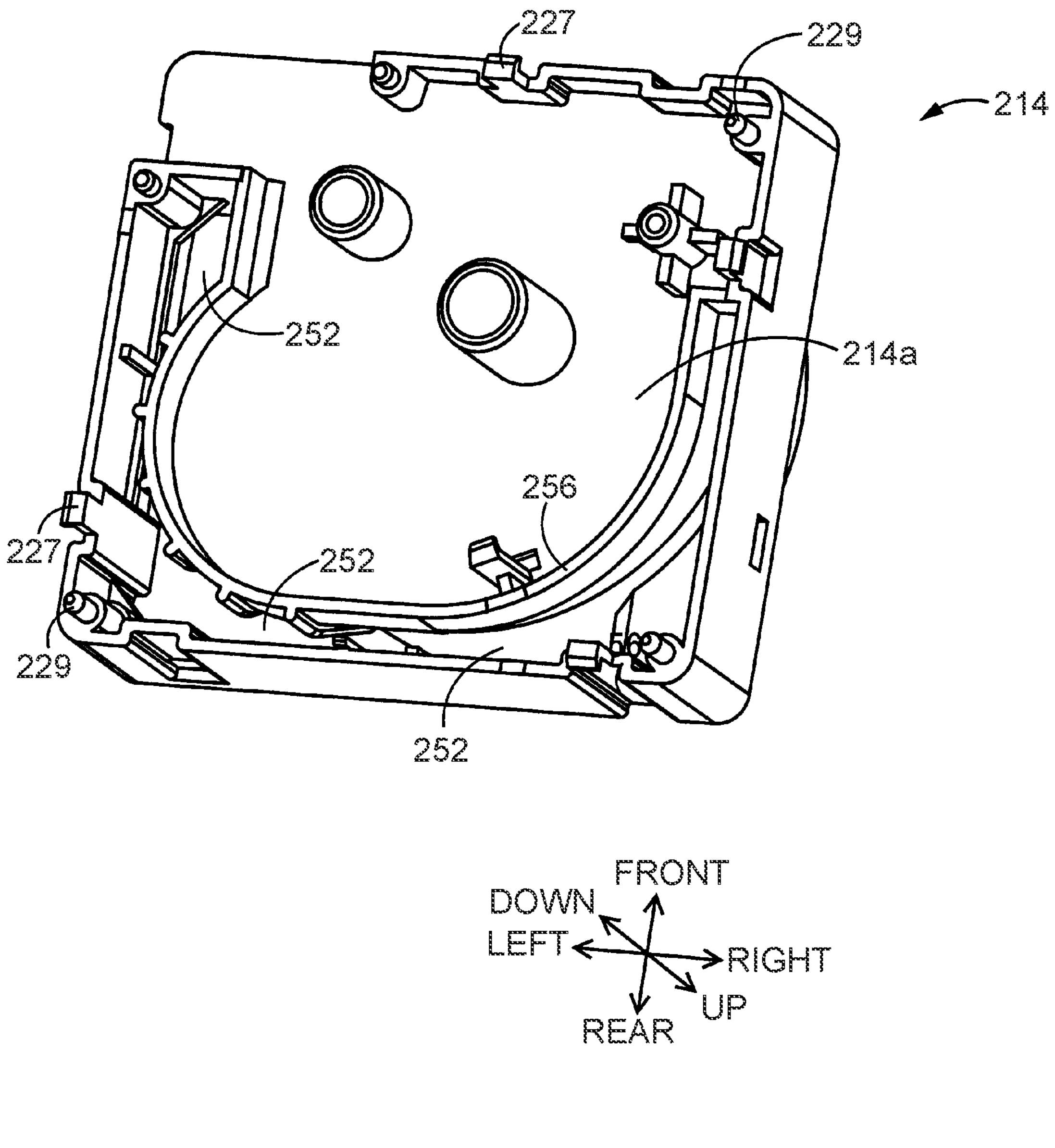
FIG. 27 is a perspective view illustrating a lower surface side of the second case member of FIG. 19.
Figure 28:
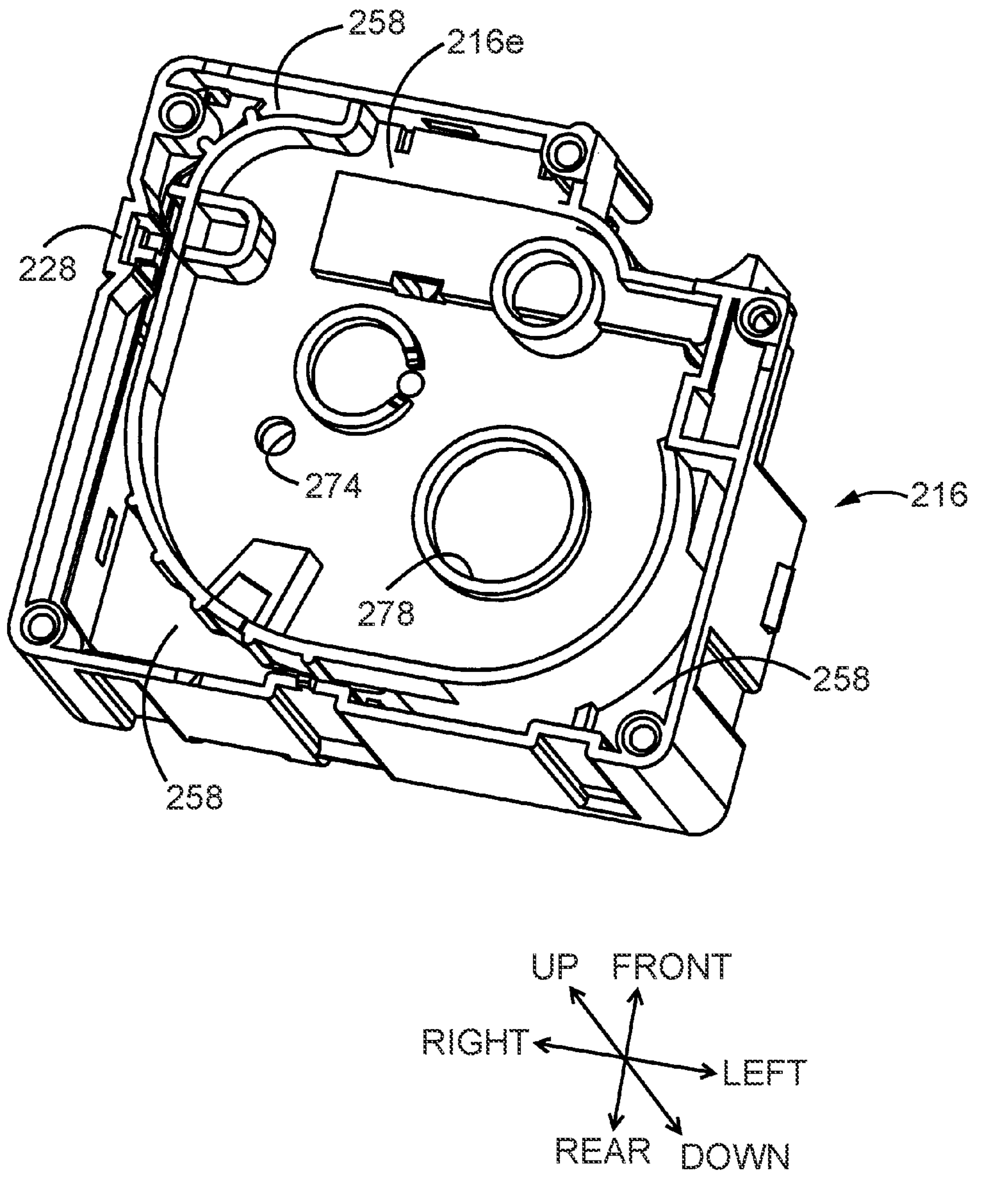
FIG. 28 is a perspective view illustrating an upper surface side of the third case member of FIG. 19.
Figure 29:
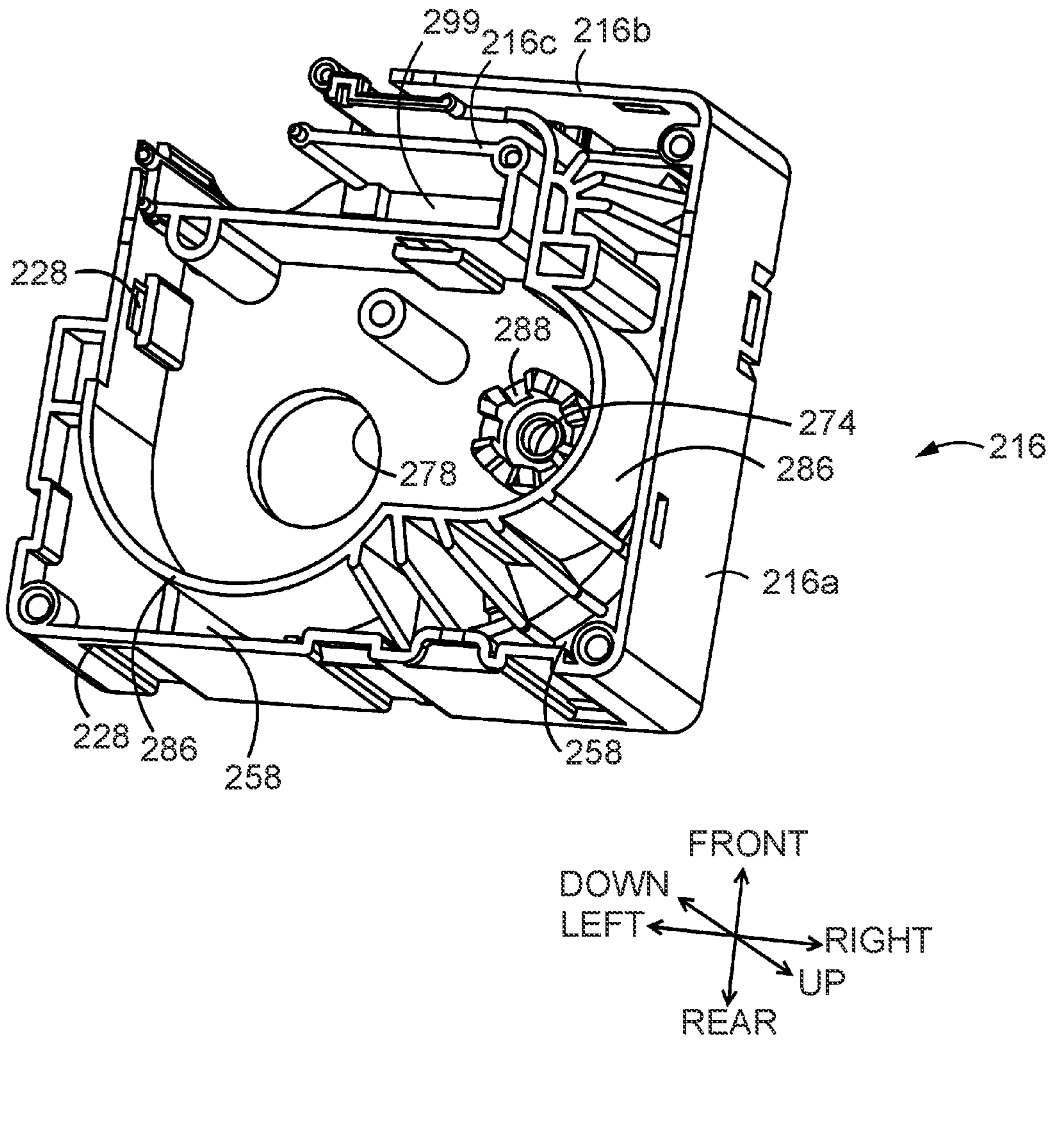
FIG. 29 is a perspective view illustrating a lower surface side of the third case member of FIG. 19.
Figure 30:
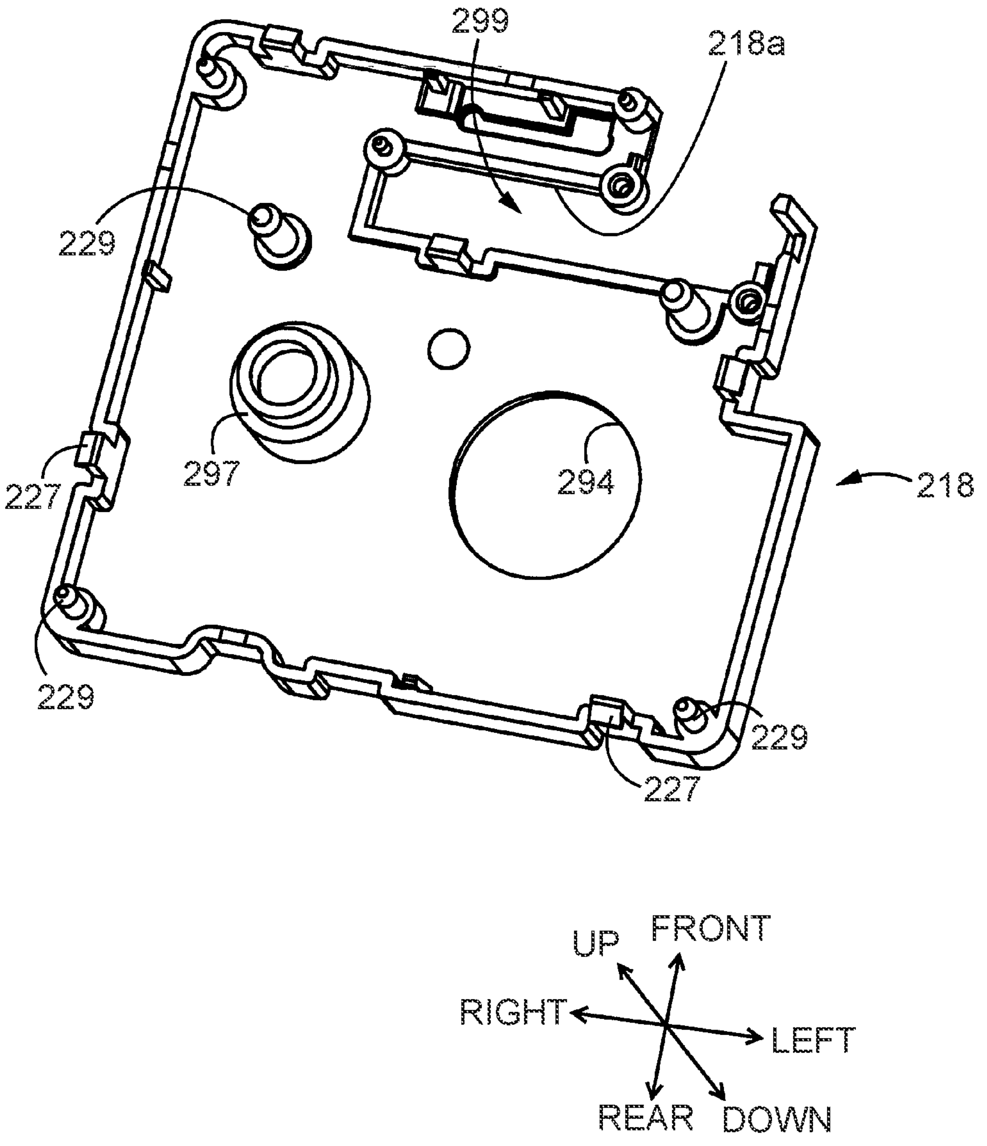
FIG. 30 is a perspective view illustrating an upper surface side of the fourth case member of FIG. 19.
Figure 31:
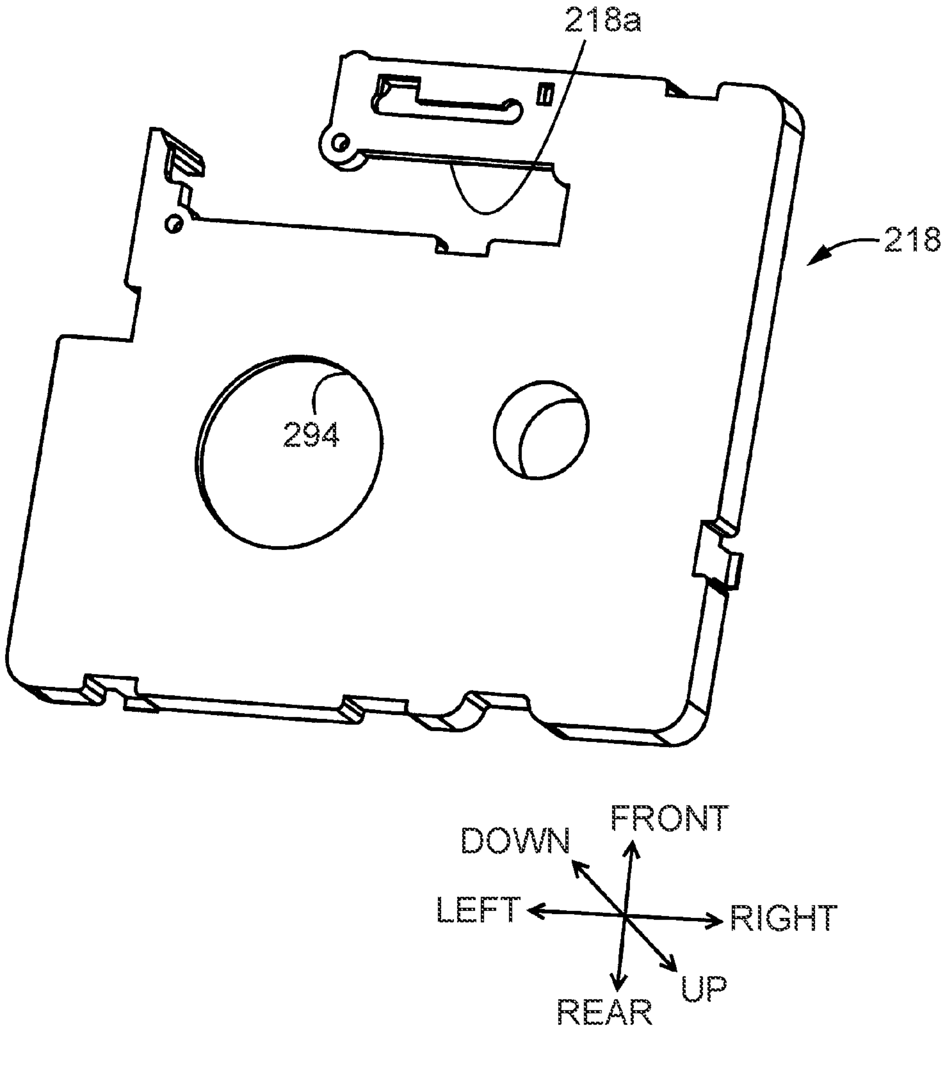
FIG. 31 is a perspective view illustrating a lower surface side of the fourth case member of FIG. 19.

FIG. 22 is a front view illustrating the upper surface side of the first case member 212. FIG. 23 is a perspective view illustrating the lower surface side of the first case member 212. FIG. 24 is a front view illustrating the upper surface side of the second case member 214. In FIG. 24, the printing tape 222 drawn from the printing tape roll 226 is not illustrated. FIG. 25 is a perspective view illustrating the upper surface side of the second case member 214. FIG. 26 is a cross sectional view taken along line XXVI-XXVI in FIG. 24, illustrating a state where the printing tape 222 extends from the inside of the tape case 220 to the inside of the ribbon case 221. FIG. 27 is a perspective view illustrating the lower surface side of the second case member 214. FIG. 28 is a perspective view illustrating the upper surface side of the third case member 216. FIG. 29 is a perspective view illustrating the lower surface side of the third case member 216. FIG. 30 is a perspective view illustrating the upper surface side of the fourth case member 218. FIG. 31 is a bottom view illustrating the lower surface side of the fourth case member 218.

The first space S1 is defined between the first case member 212 and the second case member 214. The printing tape roll 226 is accommodated in the first space S1 so as to be rotatable about a first rotation axis C1 extending parallel to the up-down direction. In the printing tape roll 226, a printing tape 222 is wound around a printing tape spool 224 that is a cylindrical shaft core member. The first case member 212 and the second case member 214 each have a rectangular shape. The first rotation axis C1 is offset to the right from the centers of the first case member 212 and the second case member 214 with respect to the right-left direction that is the second direction, and coincides with the centers of the first case member 212 and the second case member 214 with respect to the front-rear direction that is the third direction.

Figure 34:
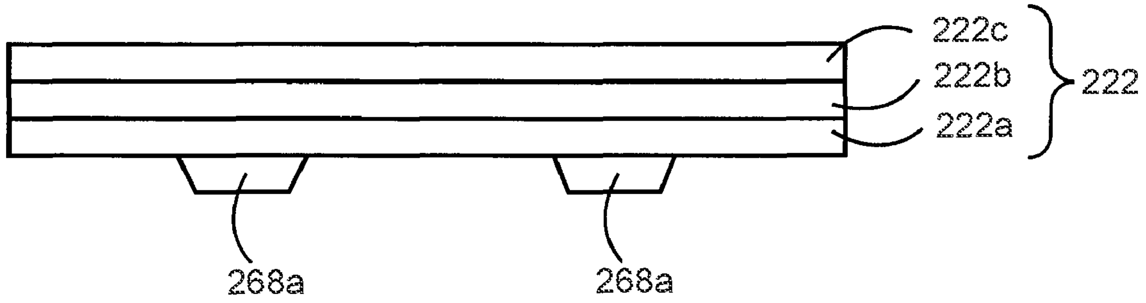
FIG. 34 illustrates a laminate of the printing tape discharged from the cassette of FIG. 19.

The printing tape 222 is a medium to be printed on which printing is to be performed by the print head 106. For example, as illustrated in FIG. 34, the printing tape 222 is a laminate in which a release tape 222*c* is laid over a surface opposite to a to-be-printed surface of a to-be-printed tape 222*a* via an adhesive 222*b*.

As illustrated in FIGS. 21 and 23, the first case member 212 includes a cylindrical first support projection 230 and a first circumferential wall 234 at its lower surface. The first support projection 230 is inserted into the cylindrical printing tape spool 224 to support the printing tape roll 226 rotatably. The first case member 212 includes an outer peripheral wall 244 having short side portions 244*a* and long side portions 244*b*. The first circumferential wall 234 has an inside diameter greater than an outside diameter of the printing tape roll 226. The first support projection 230 and the first circumferential wall 234 have an axis that is coaxial with the first rotation axis C1, and protrude downward from the lower surface of the first case member 212. As illustrated in FIGS. 24 and 25, the second case member 214 includes a cylindrical second support projection 232 and a second circumferential wall 236 at its upper surface. The second support projection 232 is inserted into the cylindrical printing tape spool 224 to support the printing tape roll 226 rotatably. The second circumferential wall 236 has an inside diameter greater than the outside diameter of the printing tape roll 226. The second support projection 232 and the second circumferential wall 236 have an axis that is coaxial with the first rotation axis C1, and protrude upward from the upper surface of the second case member 214. The printing tape roll 226 is disposed between the first case member 212 and the second case member 214 while spacer films 238 are each positioned on an upper or lower side of the printing tape roll 226. Each spacer film 38 has a disc-shape having an outside diameter equal to the outside diameter of the printing tape roll 226.

As illustrated in FIG. 23, the first case member 212 includes a printing tape gate 240 at its lower surface. The first circumferential wall 234 is partially cut away to define the printing tape gate 240. As illustrated in FIG. 24, the second case member 214 includes a printing tape gate 242 at its upper surface. The second circumferential wall 236 is partially cut away to define the printing tape gate 242. The printing tape gates 240 and 242 allow the printing tape 222 to be drawn from the printing tape roll 226 at a certain position. As illustrated in FIGS. 24 and 25, the second case member 214 includes a guide wall 250 at its upper surface. The guide wall 50 extends leftward from a left end of the printing tape gate 242. The guide wall 50 guides, in a certain direction, the printing tape 222 drawn from the printing tape roll 226. In the illustrative embodiment, a portion of the second circumferential wall 236 constitutes the guide wall 250.

As illustrated in FIG. 23, the first case member 212 includes a guide wall 248. The guide wall 248 extends leftward from the printing tape gate 240 and is connected to a short side portion 244*a* of the outer peripheral wall 244. As illustrated in FIG. 24, the guide wall 250 of the second case member 214 extends leftward from the printing tape gate 240 and is connected to a short side portion 246*a* of an outer peripheral wall 246.

As illustrated in FIG. 24, the second case member 214 includes a bottom plate 214*a* having a through hole 252. The through hole 252 extends in the front-rear direction and in the right-left direction between the second circumferential wall 236 and the short side portion 246*a* of the outer peripheral wall 246 and between the second circumferential wall 236 and a rear long side portion 246*b* of the outer peripheral wall 246, and thus has an L-shape in front view. A plurality of guide ribs 254 is disposed at the bottom plate 214*a* between the second circumferential wall 236 and the through hole 252 along a particular portion of the second circumferential wall 236. The particular portion of the second circumferential wall 236 faces a corner at which the short side portion 246*a* and the long side portion 246*b* meet each other. The plurality of guide ribs 254 guides, into the through hole 252, the printing tape 222 drawn and fed from the printing tape roll 226 through the printing tape gates 240 and 242.

FIG. 25 illustrates the cassette 210 with the first case member 212 removed. As illustrated in FIG. 25, the printing tape 222 drawn from the printing tape roll 226 is guided to a second space S2 via the through hole 252. The second space S2 is defined between the third case member 216 and the fourth case member 218. The printing tape 222 thus extends between the tape case 220 and the ribbon case 221 via the through hole 252 defined in the bottom plate 214*a* that serves as a plate member separating the first space S1 and the second space S2 from each other.

Figure 33:
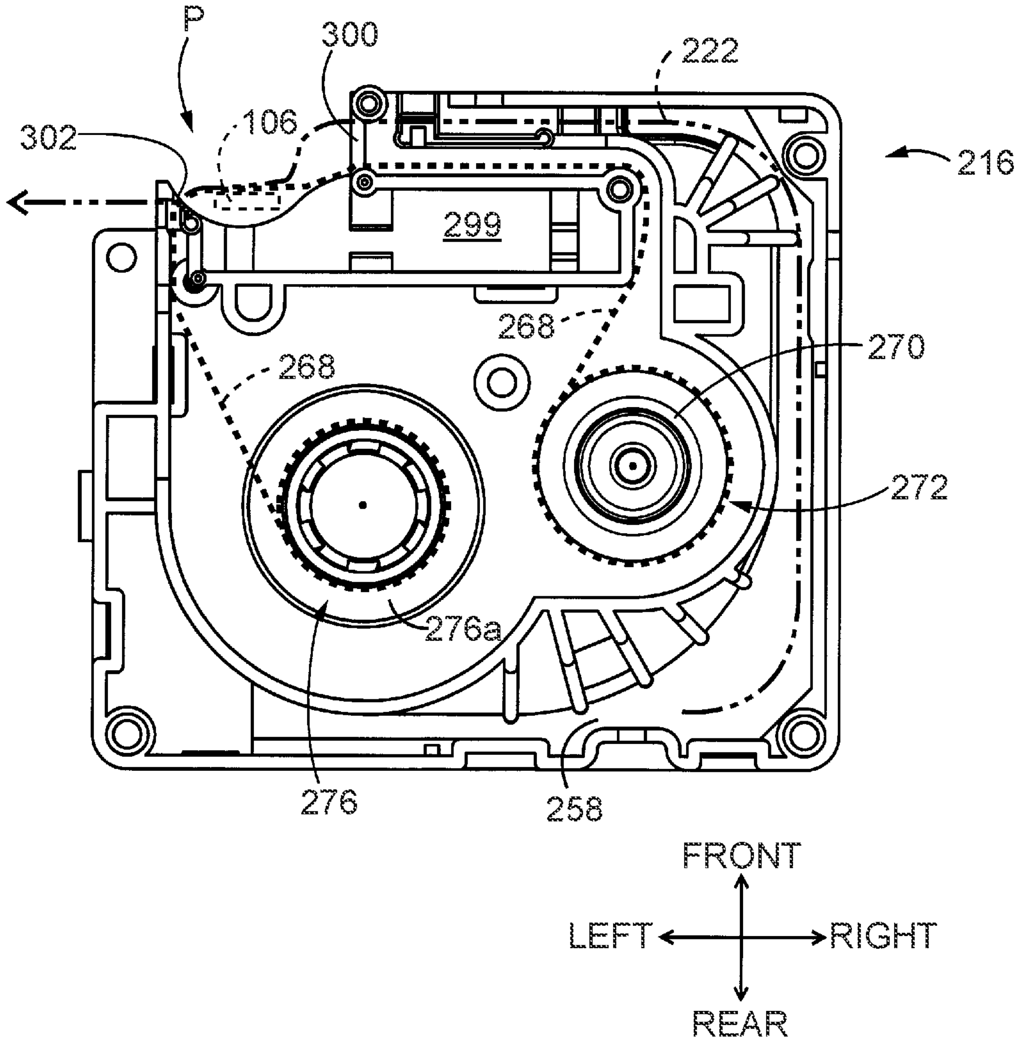
FIG. 33 is a view illustrating a path of the printing tape drawn from the printing tape roll and a path of the ink ribbon drawn from an ink ribbon roll, using a view illustrating the lower surface of the third case member of FIG. 19.

As illustrated in FIG. 26, the printing tape 222 extends in an inclined manner from the inside of the tape case 220 to the inside of the ribbon case 221 via the through hole 252. More specifically, as illustrated in FIG. 33, the printing tape 222 further extends to the recess 299 of the ribbon case 221. FIG. 27 illustrates the lower surface side of the bottom plate 214*a* of the second case member 214. As illustrated in FIG. 27, the through hole 252 penetrates the bottom plate 214*a* of the second case member 214 in bottom view. A guide wall 256 stands on a back surface of the bottom plate 214*a* of the second case member 214 in the up-down direction and extends along the through hole 252. FIG. 28 illustrates the upper surface side of the third case member 216. The third case member 216 has a through hole 258, an ink ribbon support hole 274, and a take-up spool support hole 278 defined in a ceiling plate 216*e* thereof. The through hole 258 is defined at a position corresponding to the through hole 252 of the second case member 214 to route the printing tape 222 to the second space S2. That is, a portion of the through hole 252 and a portion of the through hole 258 overlap each other in the up-down direction.

The bottom plate 214*a* of the second case member 214 and the ceiling plate 216*e* of the third case member 216 separate the first space S1 of the tape case 220 and the second space S2 of the ribbon case 221 from each other.

The ink ribbon roll 272 is supported by the ink ribbon support hole 274 so as to be rotatable about a third rotation axis C3 while one end of the feed spool 270 around which the ink ribbon 268 is wound is engaged in the ink ribbon support hole 274. The third rotation axis C3 is parallel to the first rotation axis C1. A take-up spool 276 is supported by the take-up spool support hole 278 so as to be rotatable about a fourth rotation axis C4 while one end of the take-up spool 276 is engaged in the take-up spool support hole 278. The take-up spool 276 takes up the ink ribbon 268 drawn from the ink ribbon roll 272. The fourth rotation axis C4 is parallel to the first rotation axis C1.

As illustrated in FIG. 29, the third case member 216 includes an ink ribbon roll holding wall 286 and a cylindrical projection 288 at its lower surface. The ink ribbon roll holding wall 286 has an arc shape. The ink ribbon roll holding wall 286 is disposed around the take-up spool support hole 278 concentrically about the center of the take-up spool support hole 278 to define an install position of the ink ribbon 268 taken up by the take-up spool 276. The cylindrical projection 288 protrudes downward from the periphery of the ink ribbon support hole 274. The cylindrical projection 288 has, at its distal end, ridges and grooves arranged in a circumferential direction of the cylindrical projection 288. The third case member 216 includes short side portions 216*a*, long side portions 216*b*, and a U-shaped recess wall 216*c* that constitute an outer peripheral wall of the third case member 216. The U-shaped recess wall 216*c* surrounds the recess 299.

As illustrated in FIG. 21, a clutch spring holder 290 accommodating a clutch spring is located between the one end of the feed spool 270 around which the ink ribbon 268 is wound and the distal end of the cylindrical projection 288 The clutch spring in the clutch spring holder 290 is configured to apply an appropriate rotational resistance to the ink ribbon roll 272.

FIG. 30 illustrates the upper surface of the fourth case member 218. FIG. 31 illustrates the lower surface of the fourth case member 218. The fourth case member 218 has a take-up spool support hole 294 penetrating therethrough in the up-down direction. The take-up spool 276 is rotatably supported by the take-up spool support hole 294 while the other end portion of the take-up spool 276 is engaged in the take-up spool support hole 294. The fourth case member 218 includes a cylindrical support projection 297. The support projection 297 is coupled to the other end of the feed spool 270 to support the feed spool 270 rotatably. As illustrated in FIG. 20, the take-up spool 276 has a coupling hole 296 at the other end thereof. The coupling hole 296 of the take-up spool 276 is exposed from the lower surface of the fourth case member 218 through the take-up spool support hole 294. When the cassette 210 is mounted on the printing device 102, the take-up spool drive shaft 108 of the printing device 102 is inserted into the coupling hole 296 and coupled to the take-up spool 276. In such a state, the take-up spool 276 is rotationally driven by the take-up spool drive shaft 108. As illustrated in FIGS. 30 and 31, the fourth case member 218 has a U-shaped cutout 218*a* corresponding to the recess wall 216*c*. The recess wall 216*c* and the cutout 218*a* define the recess 299.

Figure 32:
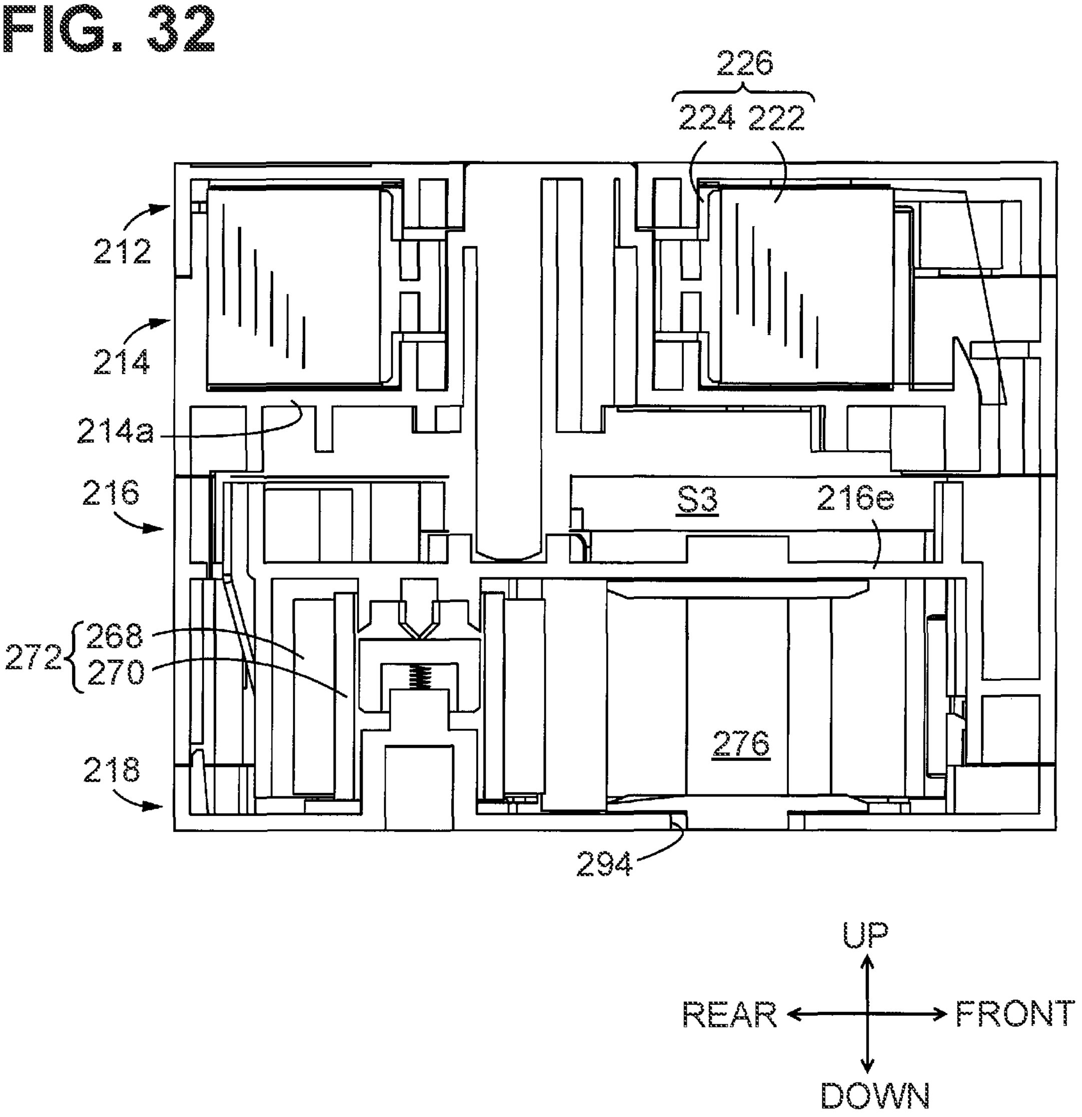
FIG. 32 is a cross sectional view of the cassette of FIG. 19 taken along line XXXII-XXXII of FIG. 24.

FIG. 32 is a sectional view taken along line XXXII-XXXII of FIG. 24. A third space S3 is defined between the tape case 220 and the ribbon case 221, that is, between the bottom plate 214*a* of the second case member 214 and the ceiling plate 216*e* of the third case member 216. The third space S3 has a certain volume.

FIG. 33 illustrates the lower surface of the third case member 216. FIG. 33 illustrates a path of the printing tape 222 drawn from the printing tape roll 226 and a path of the ink ribbon 268 drawn from the ink ribbon roll 272 in a state where the cassette 210 is mounted on the cassette mounting portion 104 on which the take-up spool drive shaft 108 stands. As described above, the printing tape 222 is drawn from the printing tape roll 226 and is routed such that the printing tape 222 extends in the inclined manner from the first space S1 of the tape case 220 to the second space S2 of the ribbon case 221 via the through hole 252 and the through hole 258. Thus, FIG. 33 illustrates a particular portion of the printing tape 222 extending in the third case member 216 from the through hole 258 defined at the rear end portion of the third case member 216. As the take-up spool 276 takes up the ink ribbon 268 by rotation of the take-up spool drive shaft 108, the printing tape 222 nipped together with the ink ribbon 268 between the print head 106 and the platen roller 116 is drawn from the printing tape roll 226. In FIG. 33, the path of the printing tape 222 is indicated by a double-dotted-and-dashed line, and the path of the ink ribbon 268 drawn from the ink ribbon roll 272 by the driving of the take-up spool 276 is indicated by a dashed line.

At the printing position P between the print head 106 and the platen roller 116, the printing tape 222 is pressed to the print head 106 via the ink ribbon 268. In this state, heating elements disposed at a surface of the print head 106 are selectively driven to generate heat locally, whereby some of ink 68*a* provided on an entire surface of the ink ribbon 268 is transferred to the printing tape 222, and characters, symbols, and other representations are printed on the printing tape 222. The ink ribbon 268 is discharged from the ribbon case 221 through an outlet 300 of the ribbon case 221, that is, through the outlet 300 of the third case member 216 of the cassette 210, toward the printing position P together with the printing tape 222. The used ink ribbon 268 that has passed the printing position P is conveyed into the ribbon case 221 through an inlet 302 of the ribbon case 221 and is taken up by the take-up spool 276. In the cassette 210, the outlet 300 is defined in the ribbon case 221 that is located on the lower side in the up-down direction with respect to the printing tape roll 226. In the cassette 210, the inlet 302 is defined in the ribbon case 221 that is located on the lower side in the up-down direction with respect to the printing tape roll 226.

FIG. 34 schematically illustrates a lamination structure of the printing tape 222 discharged from the cassette 210. The printing tape 222 is a laminate of a to-be-printed tape 222*a*, an adhesive 222*b*, and a release tape 222*c*. The release tape 222*c* is adhered to a non-print surface of the to-be-printed tape 222*a* via the adhesive 222*b*. The to-be-printed tape 222*a* has ink 268*a* transferred from the ink ribbon 268 onto its to-be-printed surface. In FIG. 34, not all components 222*a* to 222*c*, and 268*a* of the laminate are accurately illustrated in size or proportion.

Figure 35:
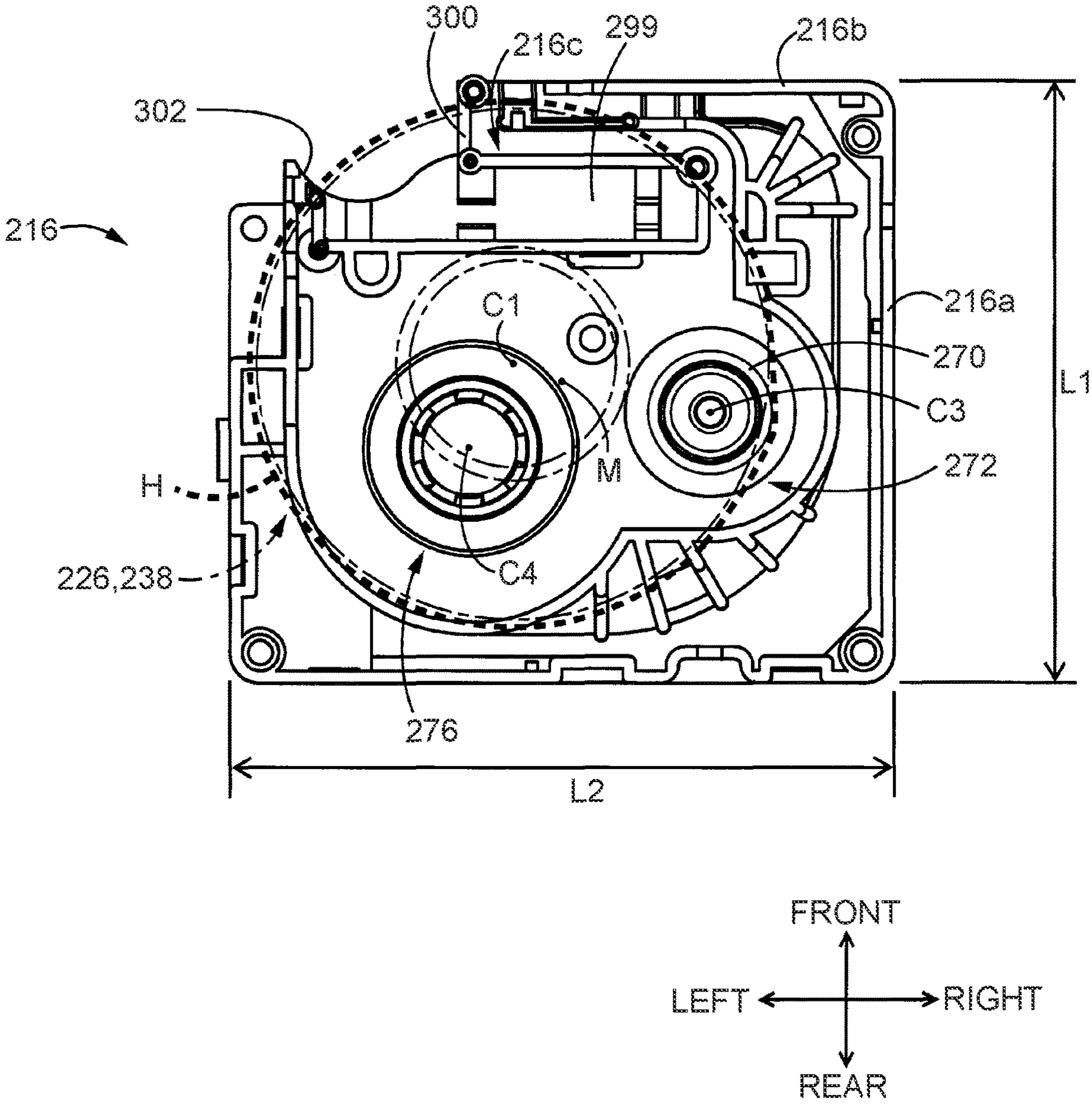
FIG. 35 is a plan view of the cassette of FIG. 19, illustrating relative positions of the printing tape roll, the ink ribbon roll, and a take-up spool.

FIG. 35 illustrates the lower surface of the third case member 216. The ink ribbon roll 272 and the take-up spool 276 are accommodated in the second space S2 defined between the third case member 216 and the fourth case member 218, that is, in the ribbon case 221. As described above, the ribbon case 221 is disposed below the tape case 220 in the up-down direction in a stacked manner. In a case where the printing tape roll 226 and the spacer films 238 accommodated in the tape case 220 are projected in the up-down direction onto a projection plane extending in the front-rear direction and the right-left direction in the second space S2, projected contours of the printing tape roll 226 and spacer films 238 are indicated by a dotted-and-dashed line in FIG. 35. The front-rear direction and the right-left direction are orthogonal to the up-down direction. The spacer films 238 have the same diameter as the diameter of the printing tape roll 226. In FIG. 35, thus, the dotted-and-dashed line indicates the printing tape roll 226 only. As illustrated in FIG. 35, the ink ribbon roll 272 and the take-up spool 276 overlap the printing tape roll 226 in the up-down direction. As illustrated in FIG. 35, the printing tape roll 226 has the diameter greater than a diameter of the ink ribbon roll 272. The ink ribbon roll 272 has a diameter greater than a diameter of the take-up spool 276.

In FIG. 35, the printing tape roll 226 overlaps the third rotation axis C3 of the ink ribbon roll 272 and the fourth rotation axis C4 of the take-up spool 276 in the up-down direction. In other words, the third rotation axis C3 of the ink ribbon roll 272 and the fourth rotation axis C4 of the take-up spool 276 are located within a projected area of the printing tape roll 226 projected in the up-down direction. The third rotation axis C3 is also a rotation axis of the feed spool 270. At least a portion of the feed spool 270, at least a portion of the ink ribbon roll 272, at least a portion of the ink ribbon 268 taken up by the take-up spool 276, and at least a used portion of the ink ribbon 268 that has passed the printing position P overlap the printing tape roll 226 and the spacer films 238 in the up-down direction, that is, in the first direction.

A distance between the fourth rotation axis C4 of the take-up spool 276 and the third rotation axis C3 of the ink ribbon roll 272 is greater than a distance between the first rotation axis C1 of the printing tape roll 226 and the third rotation axis C3 of the ink ribbon roll 272. A distance between the first rotation axis C1 of the printing tape roll 226 and the fourth rotation axis C4 of the take-up spool 276 is less than the distance between the first rotation axis C1 of the printing tape roll 226 and the third rotation axis C3 of the ink ribbon roll 272, and more specifically, less than or equal to one-third of the distance between the first rotation axis C1 of the printing tape roll 226 and the third rotation axis C3 of the ink ribbon roll 272. The first rotation axis C1 of the printing tape roll 226 is closer to the printing position P than a straight line connecting between the fourth rotation axis C4 of the take-up spool 276 and the third rotation axis C3 of the ink ribbon roll 272 to the printing position P.

In FIG. 35, in the front-rear direction orthogonal to the up-down direction and in the right-left direction orthogonal to the up-down direction and the front-rear direction, a distance between a center position M and the first rotation axis C1 is less than each of the distance between the fourth rotation axis C4 and the center position M and the distance between the third rotation axis C3 and the center position M. The center position M is a center of the cassette 210 in the front-rear direction, that is, a midpoint in a dimension L1 in a depth direction of the cassette 210 and the center of the cassette 210 in the right-left direction, that is, a midpoint in a dimension L2 in the right-left direction. The first rotation axis C1 is the rotation axis of the printing tape roll 226. The fourth rotation axis C4 is the rotation axis of the take-up spool 276. The third rotation axis C3 is the rotation axis of the feed spool 270 around which the ink ribbon 268 is wound. A dimension in the front-rear direction of a convex envelope H defined by a tangent connecting between the peripheral circles of the printing tape roll 226, the take-up spool 276, and either one of the ink ribbon roll 272 or the feed spool 270 is greater than half of the dimension of the third case member 216 in the front-rear direction. The convex envelope H has a dimension in the right-left direction greater than half of the dimension of the third case member 216 in the right-left direction. As illustrated in FIG. 19, the outer peripheral wall of the third case member 216 partially constitutes the outer peripheral wall of the cassette 210. Thus, it may be also expressed that the dimension of the convex envelope H in each of the front-rear direction and the right-left direction is greater than half of the dimension of the cassette 210 in each corresponding one of the front-rear direction and the right-left direction. In the illustrative embodiment, the entirety of the take-up spool 276 overlaps the printing tape roll 226 in the up-down direction. Thus, the convex envelope H is defined by the tangent contacting the peripheral circles of the printing tape roll 226 and the feed spool 270.

According to the cassette 210 of the illustrative embodiment, the cassette 210 includes the printing tape roll 226 into which the printing tape 222 as a medium to be printed is wound; the feed spool 270 that is rotatable and around which the ink ribbon 268 to be used for printing on the printing tape 222 is wound; and the take-up spool 276 that is rotatable to take up the ink ribbon 268 fed from the feed spool 270. The feed spool 270 and the take-up spool 276 are located on the lower side in the up-down direction with respect to the printing tape roll 226. The up-down direction is the width direction of the ink ribbon 268 wound around the feed spool 270. At least a portion of the feed spool 270 and at least a portion of the take-up spool 276 overlap the printing tape roll 226 in the up-down direction. The printing tape roll 226, the feed spool 270, and the take-up spool 276 are thus separately located in the up-down direction and the at least a portion of the feed spool 270 and the at least a portion of the take-up spool 276 overlap the printing tape roll 226 in the up-down direction, whereby the cassette 210 may be downsized in a direction orthogonal to the up-down direction.

According to the cassette 210 of the illustrative embodiment, the fourth rotation axis C4 that is the rotation axis of the take-up spool 276 overlaps the printing tape roll 226 in the up-down direction. The cassette 210 may be thus downsized in a direction orthogonal to the up-down direction as compared with a case where the fourth rotation axis C4 of the take-up spool 276 does not overlap the printing tape roll 226 in the up-down direction.

According to the cassette 210 of the illustrative embodiment, the third rotation axis C3 that is the rotation axis of the feed spool 270 overlaps the printing tape roll 226 in the up-down direction. The cassette 210 may be thus downsized in a direction orthogonal to the up-down direction as compared with a case where the third rotation axis C3 of the feed spool 270 does not overlap the printing tape roll 226 in the up-down direction.

According to the cassette 210 of the illustrative embodiment, in the printing tape roll 226, the printing tape 222 is wound around the rotatable printing tape spool 224. At least a portion of the ink ribbon 268 taken up by the take-up spool 276 overlaps the printing tape roll 226 in the up-down direction. The cassette 210 may be thus downsized in a direction orthogonal to the up-down direction as compared with a case where at least a portion of the ink ribbon 268 taken up by the take-up spool 276 does not overlap the printing tape roll 226 in the up-down direction.

According to the cassette 210 of the illustrative embodiment, at least a portion of the take-up spool 276 overlaps the printing tape spool 224 in the up-down direction. The cassette 210 may be thus downsized in a direction orthogonal to the up-down direction as compared with a case where at least a portion of the take-up spool 276 does not overlap the printing tape spool 224 in the up-down direction.

According to the cassette 210 of the illustrative embodiment, in the printing tape roll 226, the printing tape 222 is wound around the rotatable printing tape spool 224. In the direction orthogonal to the up-down direction, the distance between the fourth rotation axis C4 that is the rotation axis of the take-up spool 276 and the first rotation axis C1 that is the rotation axis of the printing tape spool 224 is less than the distance between the third rotation axis C3 that is the rotation axis of the feed spool 270 and the first rotation axis C1 that is the rotation axis of the printing tape spool 224. The cassette 210 may be thus downsized in a direction orthogonal to the up-down direction as compared with a case where the distance between the fourth rotation axis C4 that is the rotation axis of the take-up spool 276 and the first rotation axis C1 that is the rotation axis of the printing tape spool 224 is greater than the distance between the third rotation axis C3 that is the rotation axis of the feed spool 270 and the first rotation axis C1 that is the rotation axis of the printing tape spool 224.

According to the cassette 210 of the illustrative embodiment, in the front-rear direction orthogonal to the up-down direction and in the right-left direction orthogonal to the up-down direction and the front-rear direction, the distance between the center position M and the first rotation axis C1 is less than each of the distance between the fourth rotation axis C4 and the center position M and the distance between the third rotation axis C3 and the center position M. The center position M is the center of the cassette 210 in the front-rear direction and the right-left direction. The first rotation axis C1 is the rotation axis of the printing tape roll 226. The fourth rotation axis C4 is the rotation axis of the take-up spool 276. The third rotation axis C3 is the rotation axis of the feed spool 270. The diameter of the printing tape roll 226 is greater than the diameter of the ink ribbon roll 272 and the diameter of the take-up spool 276. Thus, an larger amount of overlap between the printing tape roll 226 and each of the feed spool 270 and the take-up spool 276 may be achieved as compared with a case where the distance between the center position M and the rotation axis of the printing tape roll 226 is not less than the distance between the rotation axis of the take-up spool 276 and the center position M and the distance between the rotation axis of the feed spool 270 and the center position M whereby the cassette 210 may be thus downsized in a direction orthogonal to the up-down direction.

According to the cassette 210 of the illustrative embodiment, the dimension in the front-rear direction of the convex envelope H defined by the tangent contacting the peripheral circles of the printing tape roll 226, the take-up spool 276, and either one of the ink ribbon roll 272 or the feed spool 270 is greater than half of the dimension of the cassette 210 in the front-rear direction orthogonal to the up-down direction. The dimension of the convex envelope H in the right-left direction is also greater than half of the dimension of the cassette 210 in the right-left direction orthogonal to the up-down direction and the front-rear direction. The printing tape roll 226, the take-up spool 276, and the feed spool 270 thus occupy a large portion of the space in the cassette 210, whereby the cassette 210 may be thus downsized in a direction orthogonal to the up-down direction.

According to the cassette 210 of the illustrative embodiment, the cassette 210 includes the tape case 220 and the ribbon case 221. The tape case 220 accommodates the printing tape roll 226. The ribbon case 221 is located on the one side in the first direction with respect to the tape case 220 and accommodates the feed spool 270 and the take-up spool 276. The ribbon case 221 has the outlet 300 and the inlet 302. The outlet 300 allows the printing tape 222 fed from the printing tape roll 226 and the ink ribbon 268 wound around the feed spool 270 to be discharged from the ribbon case 221 therethrough. The inlet 302 allows the ink ribbon 268 that has been discharged from the ribbon case 21 through the outlet 300 to be conveyed into the ribbon case 221 therethrough. The ink ribbon 268 that has been conveyed into the ribbon case 21 through the inlet 302 is taken up by the take-up spool 276. The ink ribbon 268 that has been once discharged from the ribbon case 21 through the outlet 300 and then conveyed into the ribbon case 21 through the inlet 302 is taken up by the take-up spool 276. The cassette 210 thus does not need to have a space for defining a return path for the ink ribbon 268 in the ribbon case 221, whereby the cassette 210 may be thus downsized in a direction orthogonal to the up-down direction as compared with a case where the ink ribbon 268 is taken up by the take-up spool 276 in a return path defined in the ribbon case 221.

According to the cassette 210 of the illustrative embodiment, a portion of the ink ribbon 268 extending between the inlet 302 and the take-up position at which the ink ribbon 268 is taken up by the take-up spool 276 overlaps the printing tape roll 226 in the up-down direction. The cassette 210 may be thus downsized in a direction orthogonal to the up-down direction as compared with a case where the portion of the ink ribbon 268 extending between the inlet 302 and the take-up position at which the ink ribbon 268 is taken up by the take-up spool 276 does not overlap the printing tape roll 226 in the up-down direction.

According to the cassette 210 of the illustrative embodiment, the cassette 210 includes the printing tape roll 226 into which the printing tape 222 as the medium to be printed is wound; the feed spool 270 that is rotatable and around which the ink ribbon 268 to be used for printing on the printing tape 222 is wound; the take-up spool 276 that is rotatable to take up the ink ribbon 268 fed from the feed spool 270; and the spacer films 238 that each contact the printing tape roll 226 in the up-down direction that is the width direction of the ink ribbon 268 wound around the feed spool 270. At least a portion of the feed spool 270 and at least a portion of the take-up spool 276 overlap the spacer films 238 in the up-down direction. The cassette 210 may be thus downsized in a direction orthogonal to the up-down direction as compared with a case where the spacer films 238 and the ink ribbon 268 do not overlap each other in the up-down direction.

The above-described illustrative embodiments are merely example embodiments of the disclosure, and various modifications may be applied to the disclosure in the scope without departing from the spirit thereof.

For example, the cassette 10 of the first illustrative embodiment includes the roller 80, but might not include the roller 80. In each of the above-described illustrative embodiments, the printing tape roll 26, 226, the laminating tape roll 64, the ink ribbon roll 72, 272, and the take-up spool 76, 276 are disposed horizontal to the front-rear direction or the right-left direction. Nevertheless, the printing tape roll 26, 226, the laminating tape roll 64, the ink ribbon roll 72, 272, and the take-up spool 76, 276 might not be disposed horizontal to the front-rear direction or the right-left direction. In a case where, for example, the ink ribbon roll 72, 272 is not disposed horizontal to the front-rear direction and the right-left direction, the first direction that corresponds to the width direction of the ink ribbon 68, 268 does not correspond to the up-down direction defined in the above-described illustrative embodiments. In this case, the second direction orthogonal to the first direction corresponding to the width direction of the ink ribbon 68, 268 does not correspond to the front-rear direction defined in the above-described illustrative embodiments. The third direction orthogonal to the first direction and the second direction does not correspond to the right-left direction defined in the above-described illustrative embodiments. The path of the printing tape 22, the path of the laminating tape 60, and the path of the ink ribbon 68 are not limited to the respective paths illustrated in FIG. 14, and other paths may be adopted as appropriate. For example, after the ink ribbon 68 is conveyed into the ribbon case 21 through the inlet 132, the ink ribbon 68 may pass by the left and the rear of the laminating tape roll 64 and be then taken up by the take-up spool 76. In this case, also, in a case where at least a portion of the ink ribbon 68 that has been conveyed into the ribbon case 21 through the inlet 132 overlaps the printing tape roll 26 in the up-down direction, the cassette may be downsized in the direction orthogonal to the up-down direction. The path of the printing tape 222 and the path of the ink ribbon 268 are not limited to the respective paths illustrated in FIG. 33, and other paths may be adopted as appropriate. The positions of the laminating tape roll 64, the ink ribbon roll 72, 272, and the take-up spool 76, 276 are not limited to the respective positions represented in the above-described illustrative embodiments. For example, the laminating tape roll 64 may be disposed further to the right than the take-up spool 76. The take-up spool 276 may be disposed further to the right than the ink ribbon roll 272. In the first illustrative embodiment, the laminating tape roll 64, the feed spool 70, and the take-up spool 76 overlap the printing tape roll 26 in the up-down direction. Nevertheless, only the feed spool 70 and the take-up spool 76 may overlap the printing tape roll 26 in the up-down direction.

Figure 36:
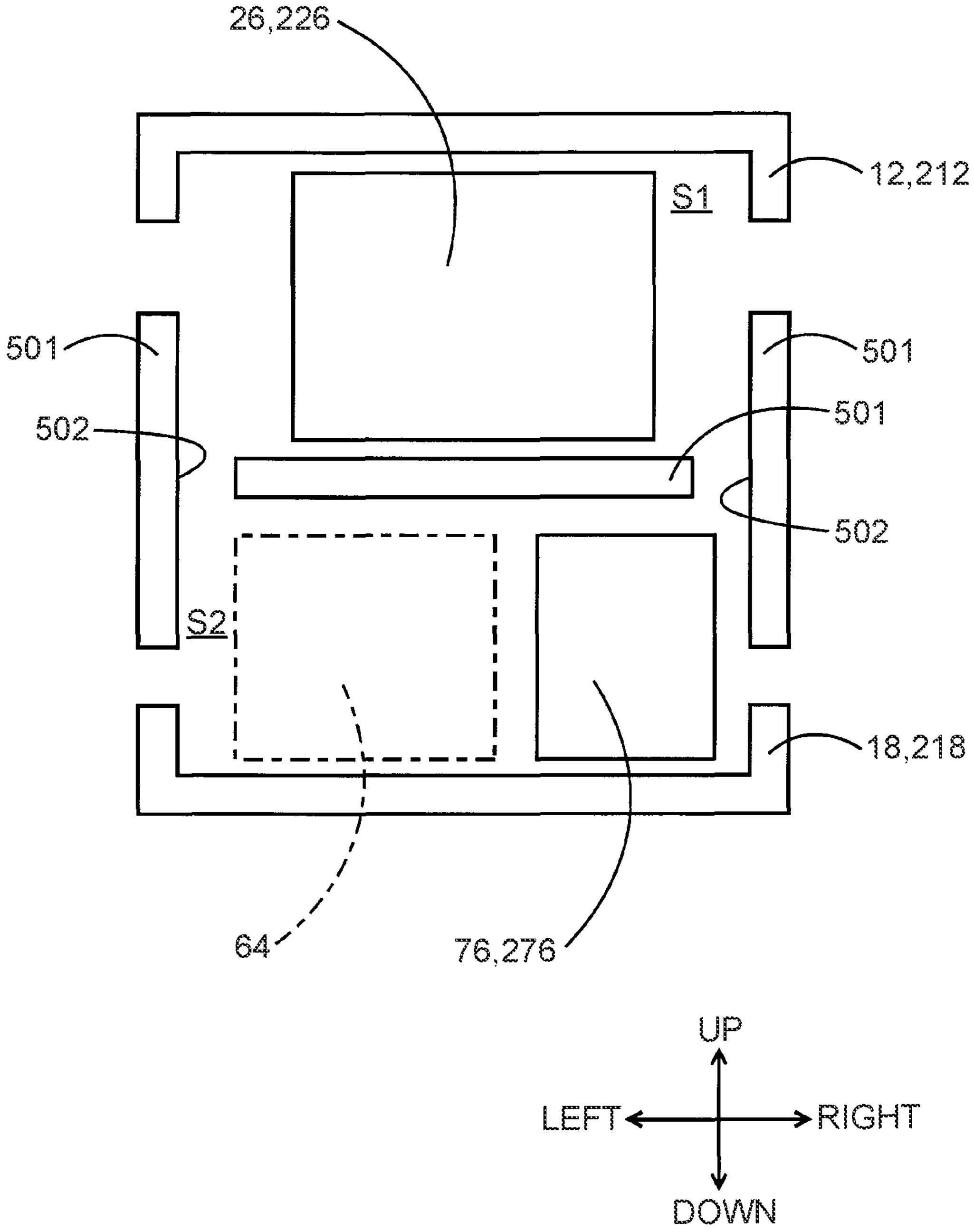
FIG. 36 is a schematic view illustrating a configuration of a cassette according to another illustrative embodiment of the disclosure.

In each of the above-described illustrative embodiments, the cassette 10, 210 includes four case members that are the first case member 12, 212, the second case member 14, 214, the third case member 16, 216, and the fourth case member 18, 218 connected to each other in the stacked manner in the up-down direction. Nevertheless, the configuration of the cassette 10, 210 is not limited to such a configuration. For example, as illustrated in FIG. 36, a cassette 10, 210 may include three case members that may be a first case member 12, 212, a fifth case member 501, and a fourth case member 18, 218 connected to each other in a stacked manner in the up-down direction. The fifth case member 501 has a through hole 502 penetrating therethrough in the up-down direction. The through hole 502 corresponds to the through holes 52, 58, 252, and 258 of the above-described illustrative embodiments. The fifth case member 501 separates a first space S1 and a second space S2 from each other. The fifth case member 501 may have an upper surface whose surface geometry may be identical to the surface geometry of the upper surface of the second case member 14, 214 and a lower surface whose surface geometry may be identical to the surface geometry of the third case member 16, 216. In this modification, the first case member 12, 212 and the fifth case member 501 constitute a tape case 20, 220 having the first space S1 therein, and the fifth case member 501 and the fourth case member 18, 218 constitute a ribbon case 21, 221 having the second space S2 therein.

In the printing tape roll 26, 226 of each of the above-described illustrative embodiments, the printing tape 22, 222 is wound around the printing tape spool 24, 224 that is a cylindrical shaft core member. Nevertheless, the printing tape roll 26, 226 may be configured such that the printing tape 22, 222 is wound around the first support projection 30, 230 and the second support projection 32, 232 but not wound around the printing tape spool 24, 224. Similarly, the laminating tape 60 may be wound without being wound around the laminating tape spool 62, and be located with its outer periphery being defined by the laminating tape roll holding wall 84 and the arc-shaped wall 92.

The dimension of the printing tape roll 26, 226 is not limited to the dimension shown by an index with respect to the third case member 16, 216 in FIG. 16 or 35 of to the above-described illustrative embodiments. For example, the printing tape roll 26, 226 may have a diameter large enough to contact an inner surface of a side wall of the tape case 20, 220. In this case, when the printing tape 22 is drawn and discharged from the tape case 20, 220 to the printing position P through the outlet 130, 300, the printing tape roll 26, 226 overlaps the printing tape 22, 222 discharged from the tape case 20, 220 through the outlet 130, 300 in the up-down direction. In this case, the printing tape 22, 222 conveyed in the ribbon case 21, 221 overlaps the printing tape roll 26, 226 in the up-down direction before the printing tape 22, 222 is discharged to the outside of the ribbon case 21, 221 through the outlet 130, 300. Even when such a configuration is adopted, the cassette may be downsized in a direction orthogonal to the up-down direction.

The above-described illustrative embodiments are merely example embodiments of the disclosure, and various modifications may be applied to the disclosure in the scope without departing from the spirit thereof.

What is claimed is:

1. A cassette comprising:

a tape roll;

a feed spool being rotatable about a first axis extending in a first direction, the feed spool around which an ink ribbon is wound;

a take-up spool being rotatable to take up the ink ribbon from the feed spool;

a tape case accommodating the tape roll; and a ribbon case located at a one side of the cassette in the first direction, the ribbon case accommodating the feed spool and the take-up spool, the ribbon case including an outlet that allows a tape from the tape roll to be discharged from the ribbon case, wherein at least a portion of the feed spool and at least a portion of the take-up spool overlap the tape roll in the first direction, and wherein the outlet is spaced apart from the tape roll in the first direction.

2. The cassette according to claim 1, wherein the take-up spool is rotatable about a second axis extending in the first direction, and wherein the second axis overlaps the tape roll in the first direction.

3. The cassette according to claim 1, wherein the first axis overlaps the tape roll in the first direction.

4. The cassette according to claim 1, wherein, in the tape roll, the tape is wound around a tape spool being rotatable, and wherein at least a portion of the ink ribbon taken up by the take-up spool overlaps the tape spool in the first direction.

5. The cassette according to claim 4, wherein at least a portion of the take-up spool overlaps the tape spool in the first direction.

6. The cassette according to claim 1, wherein: in the tape roll, the tape is wound around a tape spool being rotatable, and wherein, in a direction orthogonal to the first direction, a distance between a rotation axis of the take-up spool and a rotation axis of the tape spool is less than a distance between a rotation axis of the feed spool and the rotation axis of the tape spool.

7. The cassette according to claim 1, wherein a distance between a center position and a rotation axis of the tape roll is less than each of a distance between a rotation axis of the take-up spool and the center position and a distance between a rotation axis of the feed spool and the center position in a second direction and a third direction, the second direction being orthogonal to the first direction, the third direction being orthogonal to the first direction and the second direction, the center position being a center of the cassette in the first direction and the third direction.

8. The cassette according to claim 1, wherein a dimension in a second direction of a convex envelop defined by the tape roll, the take-up spool, and the feed spool is greater than half of a dimension of the cassette in the second direction, the second direction being orthogonal to the first direction, and wherein a dimension in a third direction of the convex envelop is greater than half of a dimension of the cassette in the third direction, the third direction being orthogonal to the first direction and the second direction.

9. The cassette according to claim 1, further comprising:

an inlet that allows the ink ribbon that has been discharged from the ribbon case through the outlet to be conveyed into the ribbon case therethrough, wherein the ink ribbon that has been conveyed into the ribbon case through the inlet is taken up by the take-up spool.

10. The cassette according to claim 9, wherein a portion of the ink ribbon extending between the inlet and a position at which the ink ribbon is taken up by the take-up spool overlaps the tape roll in the first direction.

11. The cassette according to claim 9, wherein the ribbon case includes a laminating tape roll into which a laminating tape to be adhered to the tape is wound, and wherein at least a portion of the laminating tape roll overlaps the tape roll in the first direction.

12. The cassette according to claim 11, wherein, in the tape roll, the tape is wound around a tape spool being rotatable, and wherein at least a portion of the laminating tape roll overlaps the tape spool in the first direction.

13. The cassette according to claim 11, wherein, in the laminating tape roll, the laminating tape is wound around a laminating tape spool being rotatable, and wherein a rotation axis of the laminating tape spool overlaps the tape roll in the first direction.

14. The cassette according to claim 13, wherein, in the tape roll, the tape is wound around a tape spool being rotatable, and wherein at least a portion of the laminating tape spool overlaps the tape spool in the first direction.

15. A cassette comprising:

a tape roll;

a feed spool being rotatable about a first axis extending in a first direction, the feed spool around which an ink ribbon is wound;

a take-up spool being rotatable to take up the ink ribbon from the feed spool;

a spacer film contacting the tape roll in the first direction;

a tape case accommodating the tape roll; and a ribbon case located at a one side of the cassette in the first direction, the ribbon case accommodating the feed spool and the take-up spool, the ribbon case including an outlet that allows a tape from the tape roll to be discharged from the ribbon case, wherein at least a portion of the feed spool and at least a portion of the take-up spool overlap the spacer film in the first direction, and wherein the outlet is spaced apart from the tape roll in the first direction.

16. A cassette comprising:

a tape roll;

a feed spool being rotatable about a first axis extending in a first direction, the feed spool around which an ink ribbon is wound; and a take-up spool being rotatable to take up the ink ribbon from the feed spool;

a tape case accommodating the tape roll; and a ribbon case located at a one side of the cassette in the first direction, the ribbon case accommodating the feed spool and the take-up spool, the ribbon case including an outlet that allows a tape from the tape roll to be discharged from the ribbon case, wherein at least a portion of the take-up spool overlaps the tape roll in the first direction, and wherein the outlet is spaced apart from the tape roll in the first direction.

17. The cassette according to claim 16, wherein at least a portion of the feed spool overlaps the tape roll in the first direction.

* * * * *